(12) United States Patent
Tochio

(10) Patent No.: US 9,369,786 B2
(45) Date of Patent: Jun. 14, 2016

(54) OPTICAL TRANSMISSION DEVICE AND OPTICAL TRANSMISSION NETWORK SYSTEM

(75) Inventor: Yuji Tochio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 13/593,796

(22) Filed: Aug. 24, 2012

(65) Prior Publication Data

US 2013/0051787 A1 Feb. 28, 2013

(30) Foreign Application Priority Data

Aug. 25, 2011 (JP) ................................. 2011-183277

(51) Int. Cl.
*H04J 14/02* (2006.01)
*H04J 3/08* (2006.01)
*H04Q 11/00* (2006.01)

(52) U.S. Cl.
CPC ........ *H04Q 11/0062* (2013.01); *H04J 14/0273* (2013.01); *H04J 14/0295* (2013.01); *H04J 3/085* (2013.01); *H04J 14/0221* (2013.01); *H04J 14/0267* (2013.01); *H04J 2203/006* (2013.01)

(58) Field of Classification Search
CPC ............. H04Q 11/0062; H04J 14/0273; H04J 14/0295; H04J 3/085; H04J 14/0221; H04J 2203/006; H04J 14/0267
See application file for complete search history.

(56) References Cited

U.S. PATENT DOCUMENTS

| | | | |
|---|---|---|---|
| 6,721,502 B1* | 4/2004 | Al-Salameh et al. | 398/3 |
| 6,795,394 B1* | 9/2004 | Swinkels | H04J 3/085 370/221 |
| 2003/0170020 A1* | 9/2003 | Chaudhuri et al. | 398/5 |
| 2007/0292129 A1* | 12/2007 | Yan et al. | 398/5 |
| 2008/0240710 A1 | 10/2008 | Nishioka | |

FOREIGN PATENT DOCUMENTS

| | | |
|---|---|---|
| EP | 1 021 011 | 7/2000 |
| JP | 2000-209152 | 7/2000 |
| JP | 2000-209244 | 7/2000 |
| JP | 2000-354008 | 12/2000 |
| JP | 2008-244823 | 10/2008 |

OTHER PUBLICATIONS

Japanese Office Action dated Jan. 13, 2015 in corresponding Japanese Patent Application No. 2011-183277.

* cited by examiner

*Primary Examiner* — Shi K Li
*Assistant Examiner* — Mina Shalaby
(74) *Attorney, Agent, or Firm* — Staas & Halsey LLP

(57) ABSTRACT

An optical transmission device in an optical transmission network including nodes, provided to one of the nodes, the optical transmission device including: a receiver to receive optical signals which have different wavelengths and are multiplexed, an optical detector to detect a strength of the optical signals, a switch to set switching control information including switching request information, each corresponding to one optical signal of the optical signals, and a transmitter to transmit the switching control information by an optical signal, wherein the switch sets, in information indicating a signal fail, the switching request information corresponding to the one optical signal in the switching control information based on the strength of one optical signal of the optical signals.

9 Claims, 23 Drawing Sheets

FIG. 6

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| λ1 | REQUEST | | | | S/L | STATE | | | REQUESTED NODE ID | | | | | | | | SOURCE NODE ID | | | | | | | | RESERVED | | | | | | | 1 |
| λ2 | REQUEST | | | | RESERVED | | | | | | | | | | | | | | | | | | | | | | | | | | | 0 |
| λ3 | REQUEST | | | | RESERVED | | | | | | | | | | | | | | | | | | | | | | | | | | | 0 |
| λ4 | REQUEST | | | | RESERVED | | | | | | | | | | | | | | | | | | | | | | | | | | | 0 |
| ... | | | | | | | | | | | | | | | | | | | | | | | | | | | | | | | | |
| λn | REQUEST | | | | RESERVED | | | | | | | | | | | | | | | | | | | | | | | | | | | 0 |

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| λ1 | SF | | | | S/L | BR/SW | | | NODE ID = NODE B | | | | | | | | NODE ID = NODE C | | | | | | | | RESERVED | | | | | | | 1 |
| λ2 | SF | | | | | | | | RESERVED | | | | | | | | RESERVED | | | | | | | | | | | | | | | 0 |
| λ3 | SF | | | | | | | | RESERVED | | | | | | | | RESERVED | | | | | | | | | | | | | | | 0 |
| λ4 | SF | | | | | | | | RESERVED | | | | | | | | RESERVED | | | | | | | | | | | | | | | 0 |
| ⋮ | | | | | | | | | | | | | | | | | | | | | | | | | | | | | | | | |
| λn | SF | | | | | | | | RESERVED | | | | | | | | | | | | | | | | | | | | | | | 0 |

| 1300 | | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| λ1 | | NR | | | | S/L | | BR/SW | | NODE ID = NODE B | | | | | | | | NODE ID = NODE C | | | | | | | | RESERVED | | | | | | | 1 |
| λ2 | | SF | | | | | | | | RESERVED | | | | | | | | | | | | | | | | | | | | | | | 0 |
| λ3 | | NR | | | | | | | | RESERVED | | | | | | | | | | | | | | | | | | | | | | | 0 |
| λ4 | | NR | | | | | | | | RESERVED | | | | | | | | | | | | | | | | | | | | | | | 0 |
| ... | | | | | | | | | | | | | | | | | | | | | | | | | | | | | | | | | |
| λn | | NR | | | | | | | | RESERVED | | | | | | | | | | | | | | | | | | | | | | | 0 |

FIG. 16

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| λ1 | SF | | | | S/L | BR/SW | | | NODE ID = NODE B | | | | | | | | NODE ID = NODE C | | | | | | | | RESERVED | | | | | | | 0 |
| λ2 | NR | | | | | | | | RESERVED | | | | | | | | | | | | | | | | | | | | | | | 1 |
| λ3 | NR | | | | | | | | RESERVED | | | | | | | | | | | | | | | | | | | | | | | 0 |
| λ4 | NR | | | | | | | | RESERVED | | | | | | | | | | | | | | | | | | | | | | | 0 |
| ... | | | | | | | | | | | | | | | | | | | | | | | | | | | | | | | | |
| λn | NR | | | | | | | | RESERVED | | | | | | | | | | | | | | | | | | | | | | | 0 |

| | 1 | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| λ1 | REQUEST | | | | S/L | | STATE | | | REQUESTED NODE ID | | | | | | | | SOURCE NODE ID | | | | | | | | RESERVED | | | | | | 1 |
| λ2 | REQUEST | | | | S/L | | STATE | | | REQUESTED NODE ID | | | | | | | | SOURCE NODE ID | | | | | | | | RESERVED | | | | | | 0 |
| λ3 | REQUEST | | | | S/L | | STATE | | | REQUESTED NODE ID | | | | | | | | SOURCE NODE ID | | | | | | | | RESERVED | | | | | | 0 |
| λ4 | REQUEST | | | | S/L | | STATE | | | REQUESTED NODE ID | | | | | | | | SOURCE NODE ID | | | | | | | | RESERVED | | | | | | 0 |
| ... | | | | | | | | | | | | | | | | | | | | | | | | | | | | | | | |
| λn | REQUEST | | | | S/L | | STATE | | | REQUESTED NODE ID | | | | | | | | SOURCE NODE ID | | | | | | | | RESERVED | | | | | | 0 |

| 2100 | 1 | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| λ1 | NR | | | | S/L | | STATE | | REQUESTED NODE ID | | | | | | | | SOURCE NODE ID | | | | | | | | RESERVED | | | | | | | 1 |
| λ2 | SF | | | | S/L | | BR/SW | | NODE ID = NODE B | | | | | | | | NODE ID = NODE C | | | | | | | | RESERVED | | | | | | | 0 |
| λ3 | NR | | | | S/L | | STATE | | REQUESTED NODE ID | | | | | | | | SOURCE NODE ID | | | | | | | | RESERVED | | | | | | | 0 |
| λ4 | NR | | | | S/L | | STATE | | REQUESTED NODE ID | | | | | | | | SOURCE NODE ID | | | | | | | | RESERVED | | | | | | | 0 |
| ... | | | | | | | | | | | | | | | | | | | | | | | | | | | | | | | | |
| λn | REQUEST | | | | S/L | | STATE | | REQUESTED NODE ID | | | | | | | | SOURCE NODE ID | | | | | | | | RESERVED | | | | | | | 0 |

FIG. 22

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| λ1 | NR | | | S/L | | STATE | | | REQUESTED NODE ID | | | | | | | | SOURCE NODE ID | | | | | | | | RESERVED | | | | | | | 1 |
| λ2 | SF | | | S/L | | BR/SW | | | NODE ID = NODE B | | | | | | | | NODE ID = NODE C | | | | | | | | RESERVED | | | | | | | 0 |
| λ3 | NR | | | S/L | | STATE | | | REQUESTED NODE ID | | | | | | | | SOURCE NODE ID | | | | | | | | RESERVED | | | | | | | 0 |
| λ4 | SF | | | S/L | | BR/SW | | | NODE ID = NODE C | | | | | | | | NODE ID = NODE D | | | | | | | | RESERVED | | | | | | | 0 |
| ... | | | | | | | | | | | | | | | | | | | | | | | | | | | | | | | | |
| λn | REQUEST | | | S/L | | STATE | | | REQUESTED NODE ID | | | | | | | | SOURCE NODE ID | | | | | | | | RESERVED | | | | | | | 0 |

2200

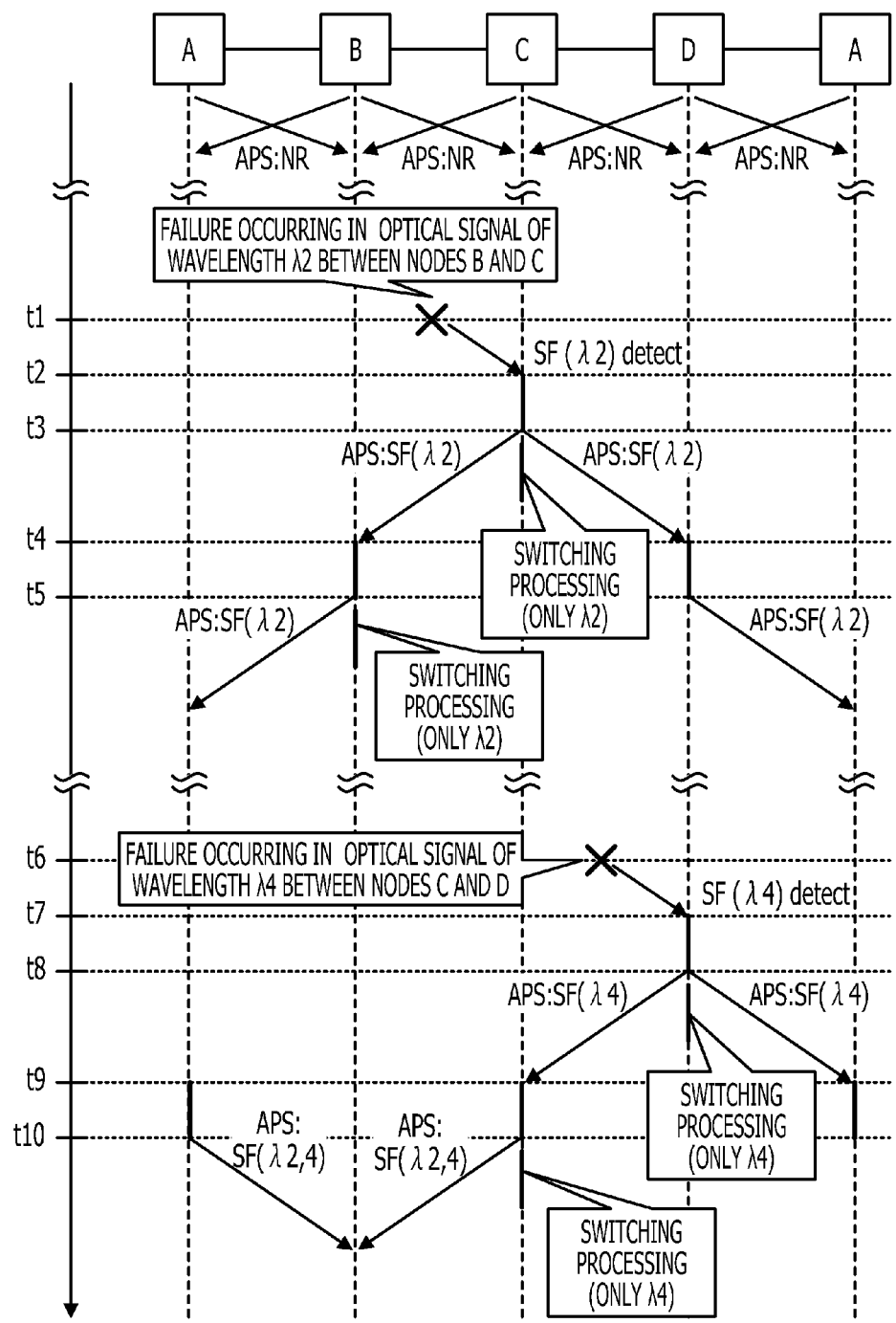

OPTICAL TRANSMISSION DEVICE AND OPTICAL TRANSMISSION NETWORK SYSTEM

CROSS-REFERENCE TO RELATED APPLICATIONS

This application is based upon and claims the benefit of priority of the prior Japanese Patent Application No. 2011-183277, filed on Aug. 25, 2011, the entire contents of which are incorporated herein by reference.

FIELD

The embodiments discussed herein are related to an optical transmission device and an optical network system.

BACKGROUND

Heretofore, SDH (Synchronous Digital Hierarchy) has been used as a digital signal optical transmission technology. Also, an APS (Automatic Protection Switching) control, which is stipulated in ITU-T Recommendation G.841, has been used as a ring protection technology of a ring network using SDH.

In a ring network, APS control is a technology to, in the case that a failure has occurred in a portion of the transmission path due to a disconnected fiber or the like, provide resolution of the failure. Optical transmission devices positioned at the nodes making up the ring network transmit/receive APS control information as a portion of the optical signals transmitted/received. The APS control information is control information including whether or not a failure has occurred in the ring network and information of nodes positioned on both ends of a transmission path that includes the location of the failure occurring (switching nodes).

The optical transmission devices receive optical signals including the APS information thereof, thereby recognizing that a failure has occurred, and the location of the failure. Also, the optical transmission devices positioned at the switching nodes indicated by the APS information executes ring switching processing of the signal transmission path. That is to say, in the case that the next transmission destination node of the received optical signal is another switching node, the optical transmission device provided on one of the switching nodes executes return processing of the transmission path, i.e. ring switching processing, to switch the transmission destination node so a transmission origin node of the received optical signal.

On the other hand, in recent years, as the amount of transmitted digital data has increased, high speed transmission technologies and wavelength multiplexing technologies such as WDM (Wavelength-Division Multiplex) have been advancing. According to the advancement of such optical transmission technologies, stipulations of optical signal (digital signal) formats have also been advancing, and in ITU-T Recommendation G.709, a transmission method called OTN (Optical Transport Network) has been standardized, a format definition corresponding to 100 Gb transmission has been stipulated, and APS control has been introduced also for same-format ODU headers.

Note that an optical transmission device has been disclosed, wherein in a WDM network, a current-use path used to transmit the optical signal and a backup path that corresponds thereto is provided for paths configured for each wavelength, and in the case that a failure is detected in a current-use path, a path switching function switches the path transmitting the optical signal to a backup path (see Japanese Laid-open Patent Publication No. 2000-209152 and Japanese Laid-open Patent Publication No. 2000-209244).

SUMMARY

According to an aspect of the invention, an optical transmission device in an optical transmission network including a plurality of nodes, provided to one of the plurality of nodes, the optical transmission device includes: a receiver configured to receive a plurality of optical signals which have a plurality of different wavelengths and are multiplexed, an optical detector configured to detect a strength of the plurality of optical signals, a switch configured to set switching control information including a plurality of switching request information, each corresponding to one optical signal from the plurality of optical signals, and a transmitter configured to transmit the switching control information by an optical signal, wherein the switch sets, in information indicating a signal fail, the switching request information corresponding to the one optical signal in the switching control information based on the strength of one optical signal of the plurality of optical signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a format configuration of APS control information relating to a first embodiment.

FIG. 10 is a diagram to describe a setting example of the APS control information in the case that an optical fiber cable which connects node B and node C is disconnected.

FIG. 13 is a diagram to describe a setting example of the APS control information in the case that a failure occurs in the optical signal having a certain wavelength λ2 between node B and node C.

FIG. 16 is a diagram to describe a setting example of the APS control information in the case that a failure occurs in the optical signal having a representative wavelength λ1 between node B and node C.

FIG. 19 is a diagram illustrating an example of a format configuration of an APS control information relating to the second embodiment.

FIG. 21 is a diagram to describe a setting example of APS control information in the case that a failure occurs in the optical signal having a certain wavelength λ2 between node B and node C.

FIG. 22 is a diagram to describe a setting example of APS control information in the case that a failure occurs in the optical signal further having a certain wavelength λ4 between node C and node D.

FIG. 23 is a diagram illustrating an example of a ring switching processing sequence in the case that a failure occurs in the optical signal having a certain wavelength λ2 between node B and node C and that a failure occurs in the optical signal further having a certain wavelength λ4 between node C and node D.

DESCRIPTION OF EMBODIMENTS

Embodiments of the present disclosure will be described below.

While inventing the present embodiments, observations were made regarding a related art. Such observations include the following, for example.

In a case where an OTN ring network is made up by combining a ring network using the above-described OTN and a WDM, for example, it is desirable to appropriately execute ring protection in the event that a failure occurs to a portion of the transmission path from a disconnected fiber or the like.

However, in the case of using WDM, multiple optical signals corresponding to multiple wavelengths may be transmitted on the same transmission path, so in an OTN ring network, multiple rings corresponding to the multiple wavelengths are formed on the same transmission path.

Therefore, in the case of simply applying a ring protection technology based on the above-described APS control as to the OTN ring network, APS control is performed for each of multiple wavelengths, leading to increased scale of the optical transmission device.

First, before describing the embodiments of the disclosure, a reference example of the disclosure will be described.

1. Reference Example

Figure 1:
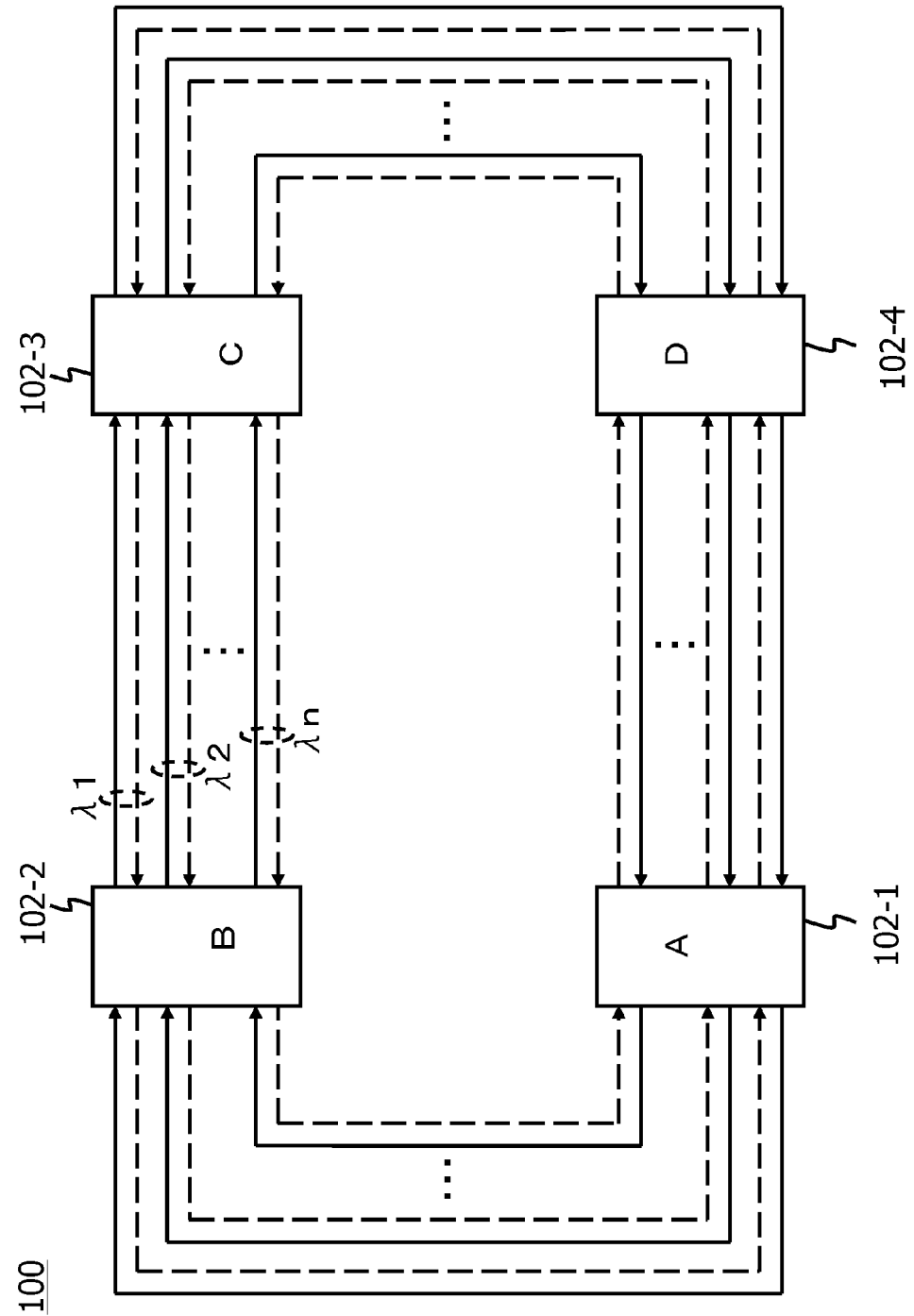
FIG. 1 is a diagram illustrating an OTN ring network that uses WDM.

FIG. 1 is a diagram illustrating an OTN ring network that uses a WDM. An OTN ring network 100 illustrated in FIG. 1 includes nodes A through D, and optical transmission devices 102-1 through 102-4 are provided to the respective nodes. The optical transmission devices positioned on adjacent nodes are mutually connected by two fiber optic cables that transmit optical signals bi-directionally. The fiber optic cables utilize WDM, whereby multiple optical signals having mutually different wavelengths are transferred within the same cable.

The OTN ring network 100 illustrated in FIG. 1 utilizes WDM, and includes multiple OTN rings corresponding to multiple wavelengths. In FIG. 1, the solid line and dotted line arrows each denote a ring to transmit the optical signal of a corresponding wavelength in the direction indicated by the arrow, and multiple rings illustrated by solid lines are formed within one of the cables of two fiber optic cables connecting the nodes, and the multiple rings illustrated by broken lines are formed within the other fiber optic cable.

Also, the OTN ring network illustrated in FIG. 1 applies BLSR (Bidirectional Line Switched Ring) as the ring switching method.

In the OTN ring network 100, in the case of realizing ring protection technology based on the above-described APS control, using a device configuration that transmits/receives APS control information for each wavelength may be considered for the optical transmission devices at each node. However, such a device configuration has to provide a processing circuit that performs APS control the number of the optical signal wavelength, which may result in larger-scale optical transmission device, and is therefore not appropriate.

Now, focusing on the multiple OTN rings, by which multiple optical signals having different wavelengths are transmitted, that are formed within the same optical fiber cable, the ring switching processing as to the multiple OTN rings within the same cable may be managed and executed together, and the optical transmission devices for each node may use a device configuration that transmits/receives only the APS control information corresponding to the optical signal having one wavelength (representative wavelength) selected from multiple wavelengths.

Figure 2:
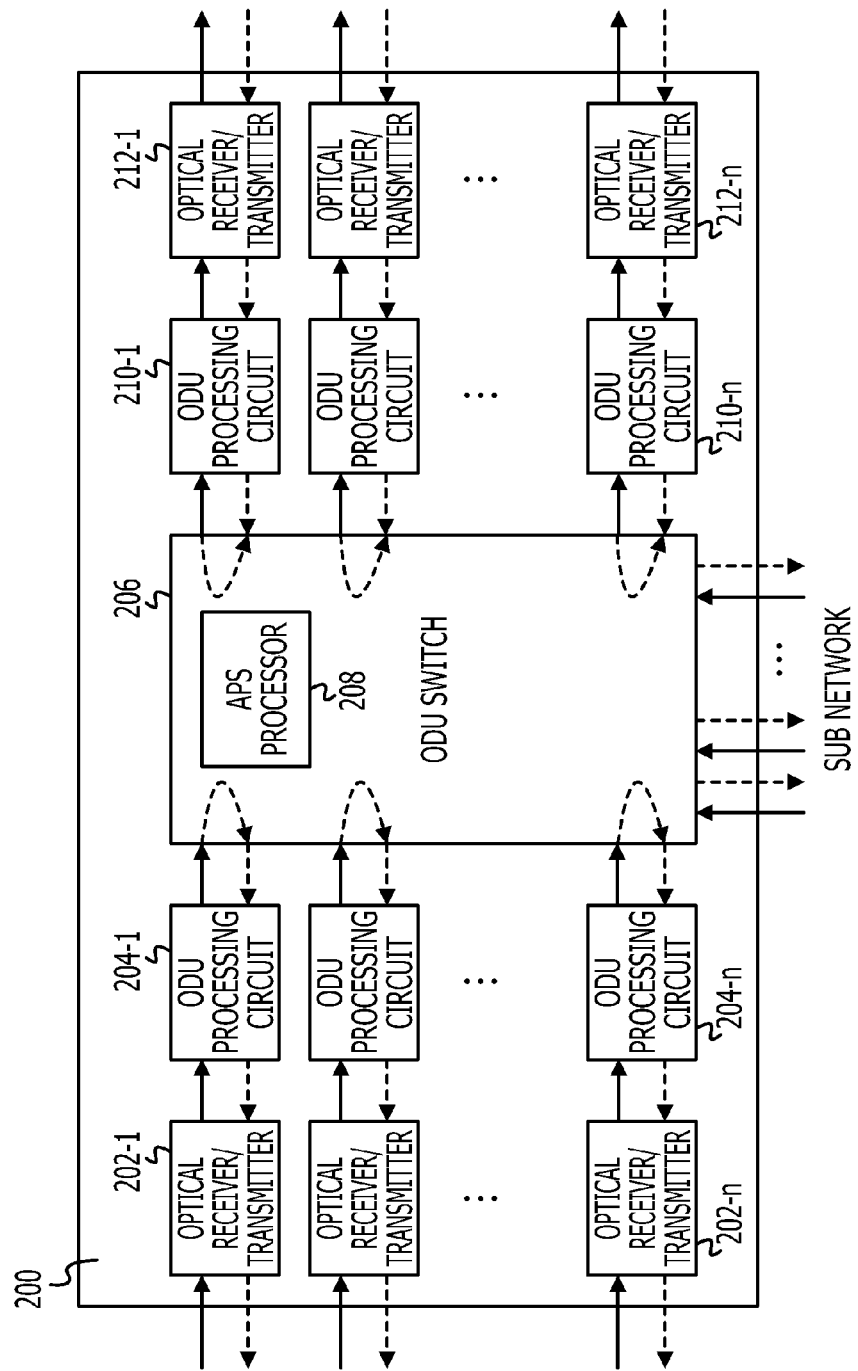
FIG. 2 is a diagram illustrating an example of an optical transmission device having a device configuration that transmits/receives only APS control information corresponding to an optical signal having a representative wavelength.

FIG. 2 is a diagram illustrating an optical transmission device having a device configuration that transmits/receives only the APS control information corresponding to the optical signal having a representative wavelength.

The optical transmission device 200 illustrated in FIG. 2 includes optical receiver-transmitters 202-1 through 202-n (n is the number of the optical signal wavelength), ODU processing circuit 204-1 through 204-n, ODU switch 206, APS processor 208, ODU processing circuit 210-1 through 210-n, and optical receiver-transmitters 212-1 through 212-n. The optical transmission device 200 corresponds to optical transmission devices 102-1 through 102-4 in the OTN ring network 100 illustrated in FIG. 1.

The optical receiver-transmitters 202-1 through 202-n and the optical receiver-transmitters 212-1 through 212-n are realized by hardware such as a photodiode that receives an optical signal from an fiber optic cable and converts this to an electrical signal, a light-emitting diode or laser diode that transmits the optical signal that has been converted into the electrical signal to the fiber optic cable, an analog circuit, a digital electronic circuit, and processor, and memory or the like. Also, the ODU processing circuit 204-1 through 204-*n*, ODU switch 206, APS processor 208, and ODU processing circuit 210-1 through 210-*n* are realized by hardware such as a digital electronic circuit, processor, memory and the like, for example. It goes without saying that the various parts herein may be realized by sharing hardware, or may be realized with individual hardware.

Now, a digital circuit may include ASIC (Application Specific Integrated Circuit), FPGA (Field-Programming Gate Array), LSI (Large Scale Integration) and so forth, for example. The processor may include a CPU (Central Processing Circuit) or DSP (Digital Signal Processor), for example. The memory may include RAM (Random Access Memory) or ROM (Read Only Memory), for example.

In the optical transmission device 200, the optical receiver-transmitters 202-1 through 202-*n* each receive multiple optical signals that have different wavelengths from optical transmission devices of adjacent nodes. The ODU processing circuits 204-1 through 204-*n* each extract an ODU (Optical-channel Data Circuit) included in the OTN frame of the received optical signal, and determines the destination node of the received optical signal based on the extracted ODU overhead (control information). The same applies to the optical receiver-transmitters 212-1 through 212-*n* and ODU processing circuits 210-1 through 210-*n*.

The APS processor 208 extracts the APS control information included in the ODU overhead of the optical signal having the received representative wavelength. The APS processor 208 determines whether or not there is any failure occurring in the OTN ring network, based on the extracted APS control information, and in the case that a failure has occurred, determines which node is the node positioned on both ends of the transmission path including the failure occurrence location (switching node). In the case that one of the switching nodes indicated by the APS control information is an own node (a node on which the optical transmission device 200 including the APS processor 208 itself is positioned), the APS processor 208 issues ring switching instructions to instruct the ODU switch 206 to execute the ring switching processing.

The ODU switch 206 executes ring switching processing based on the ring switching instructions from the APS processor 208. That is to say, in the case that the next transmission destination node of the optical signal is another switching node, the ODU switch 206 executes the return processing of the transmission path for switching the transmission destination node to the transmission source node of the received optical signal, for all of the output signals from the ODU processing circuit 204-1 through 204-*n* together, as denoted by the dotted lines in FIG. 2.

Figure 3:
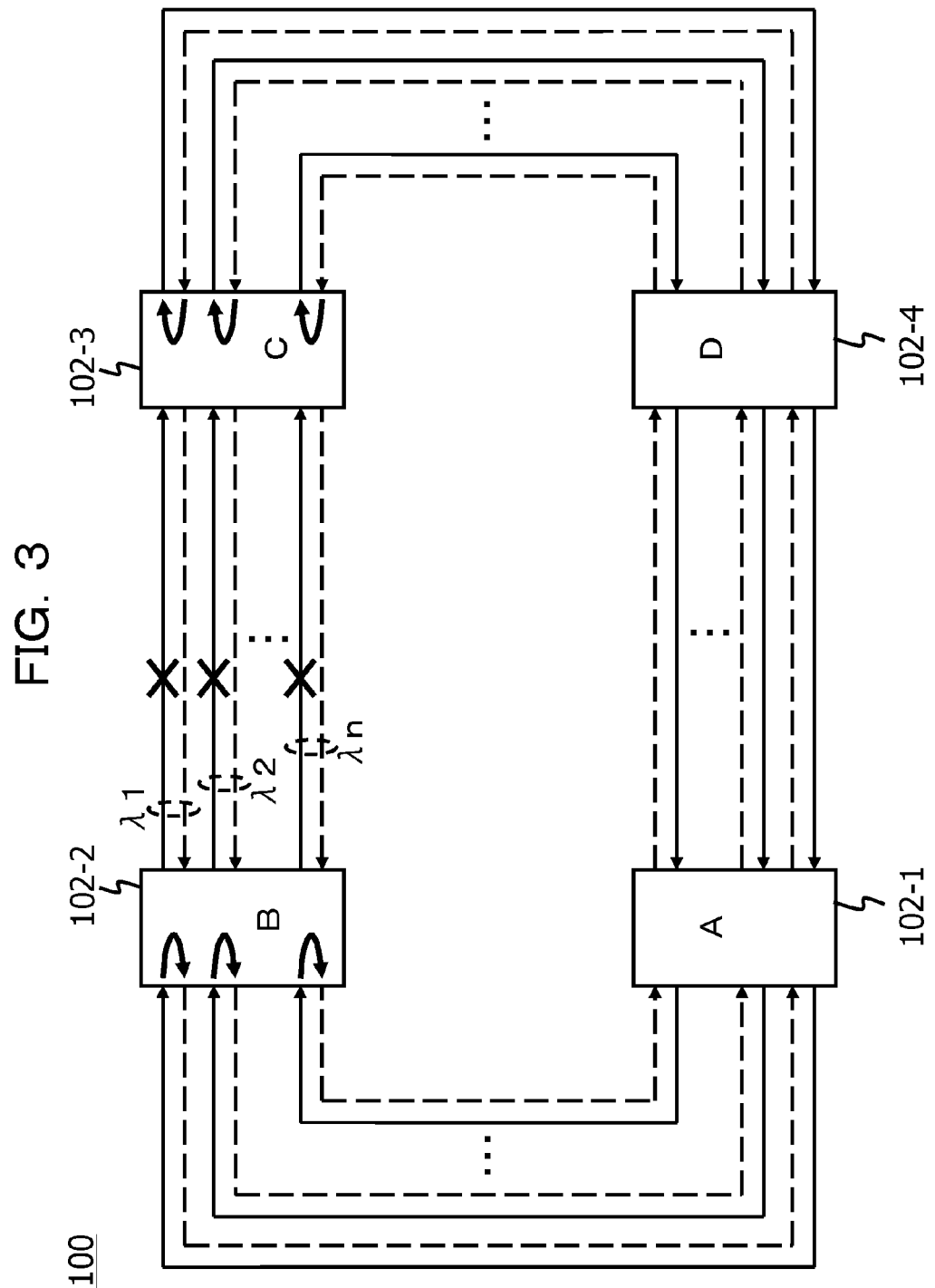
FIG. 3 is a diagram to describe ring switching processing in the case that an optical fiber cable has been disconnected between nodes.

For example, in the OTN ring network 100, in the case of a failure occurring wherein a cable which is a fiber optic cable that connects node B and node C, and that transmits the optical signal in one direction (in the direction from node B to node C) is disconnected, this means that a failure has occurred in all of the multiple OTN rings corresponding to the multiple wavelengths, as illustrated in FIG. 3. Therefore, in the optical transmission devices 102-2 and 102-3 of nodes B and C which are positioned on both ends of the transmission path including the location of failure occurrence, ring switching processing is executed for all of the multiple OTN rings together.

That is to say, as illustrated in FIG. 3, in the optical transmission device 102-2 positioned on the node B, return processing of the transmission path is executed in order to switch the next transmission destination node of the optical signal to node A instead of node C, and in the optical transmission device 102-3 positioned on the node C, return processing of the transmission path is executed in order to switch the next transmission destination node of the optical signal to node D instead of node B.

However, with the optical transmission device 200 having a device configuration to transmit/receive only APS control information corresponding to optical signals having a representative wavelength described above, even in a case where the APS control information indicates that a failure has occurred in the OTU ring network 100, whether the failure is occurring throughout all of the rings corresponding to all of the wavelengths such as the above-described fiber optic cable being disconnected, or whether the failure is in only a certain ring corresponding to the representative wavelength is indistinguishable.

Figure 4:
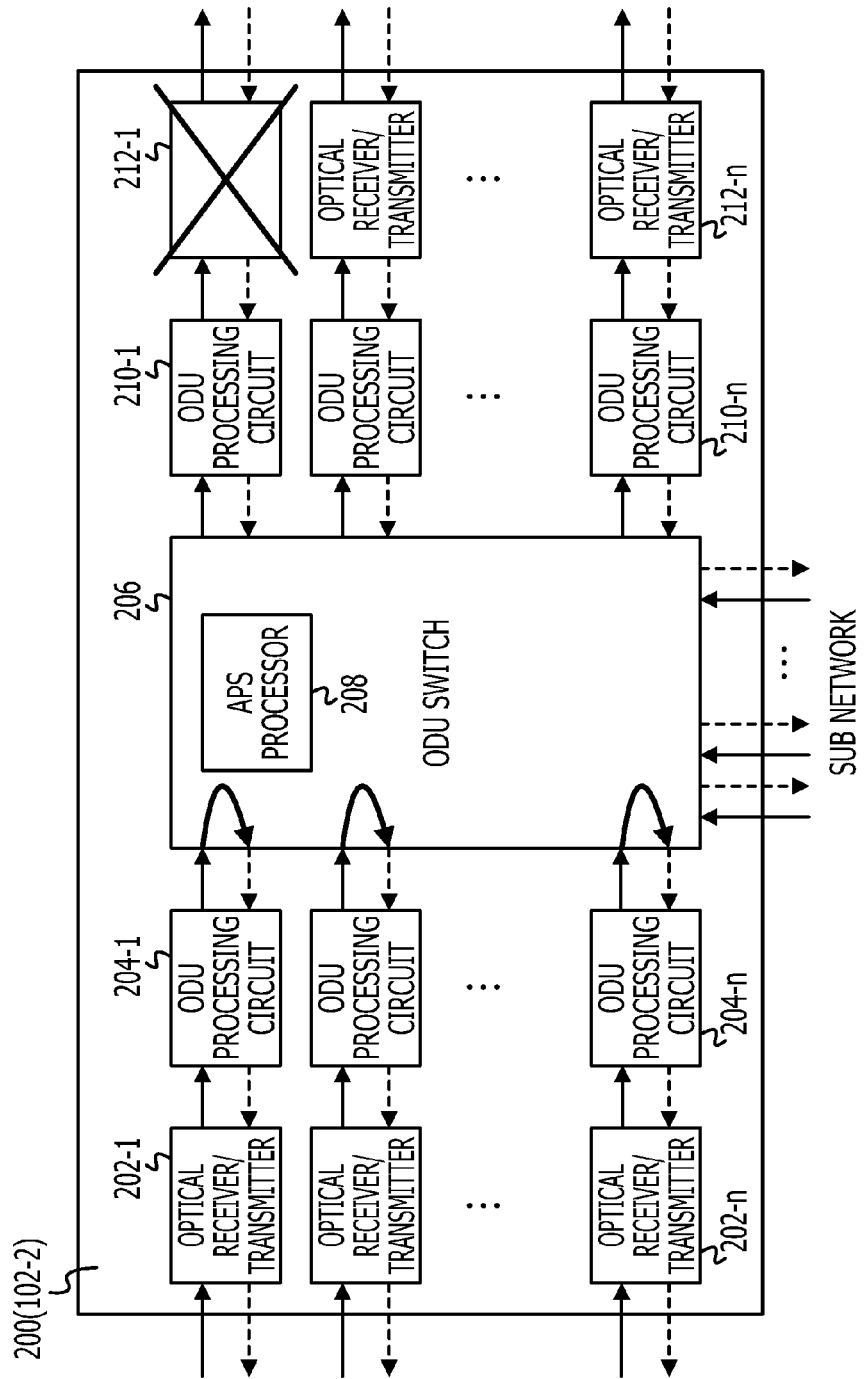
FIG. 4 is a diagram to describe a case wherein a breakdown has occurred in only the optical transmitter/receiver corresponding to the representative wavelength of the optical transmission device.

For example, let us consider the case of a breakdown occurring only in the optical receiver/transmitter 212-1 corresponding to the representative wavelength on the node C side, in the optical transmission device 102-2 (200) positioned on the node B within the OTN ring network 100, as illustrated in FIG. 4. In this case also, as illustrated in FIG. 5C, between node B and node C, optical signals having the representative wavelength are not transmitted/received normally, so the optical transmission device 102-3 positioned at node C determines that a failure has occurred between nodes B and C. Consequently, information indicating that a failure has occurred in the OTN ring network, and that the switching nodes in the ring switching processing are nodes B and C, are included in the APS control information.

Figure 5:
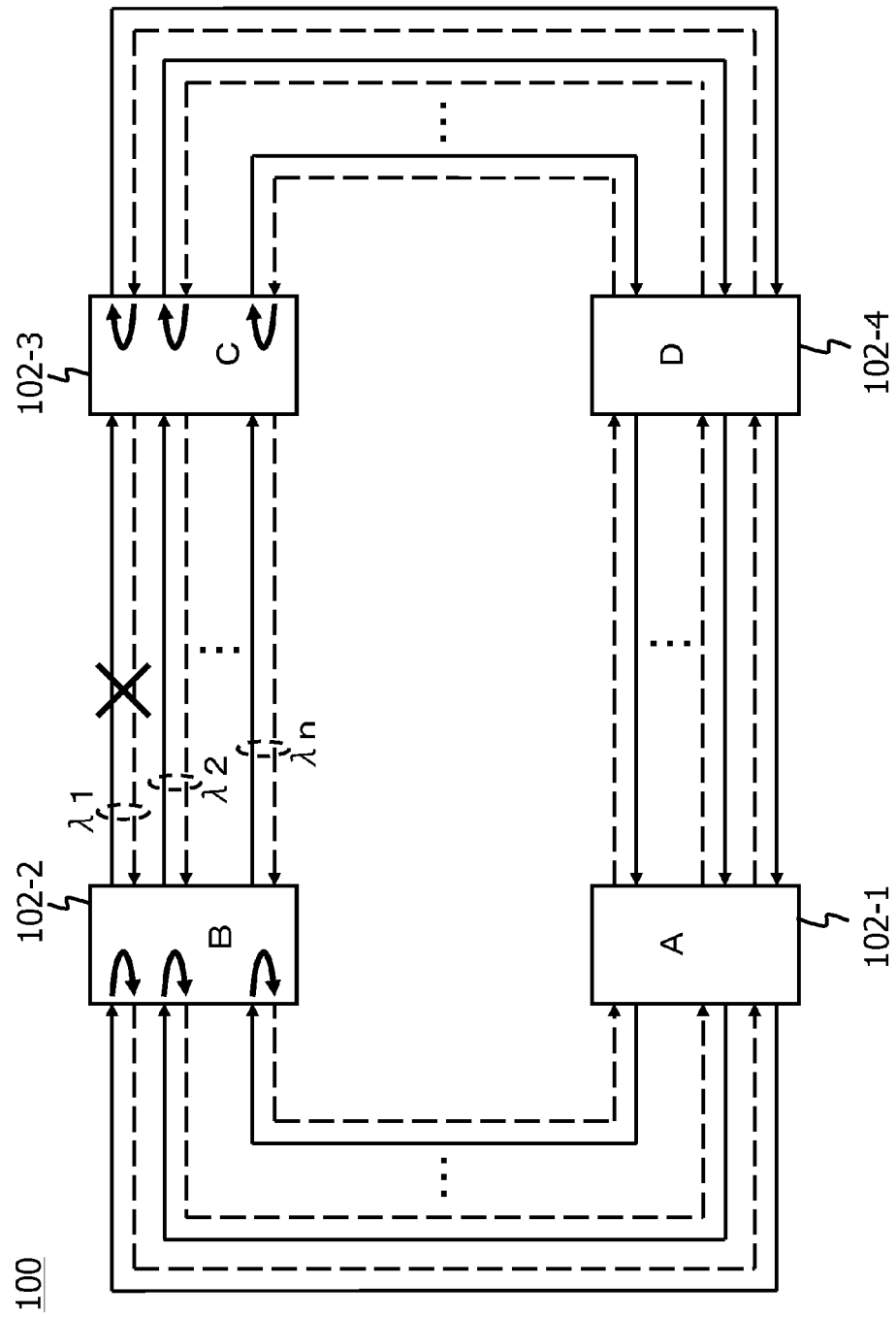
FIG. 5 is a diagram to describe the ring switching processing in the case that a breakdown has occurred in only the optical transmitter/receiver corresponding to the representative wavelength of an optical transmitting device of one node.

Therefore, as illustrated in FIG. 5, even though the actual failure is occurring only in the ring corresponding to the representative wavelength, and the rings corresponding to other wavelengths may transmit/receive optical signals normally between the nodes, the optical transmission devices 102-2 and 102-3 positioned at nodes B and C execute ring switching processing for all of the multiple OTN rings together.

Thus, in the case that some failure is occurring in only a certain ring corresponding to the representative wavelength, ring switching processing is executed not only for the certain ring where the failure is occurring, but also rings where there is no failure and where optical signals may be transmitted/received normally. Consequently, in the OTN ring network, there has been the problem of not being able to effectively use the resource of the transmission path, so optical signal transmissions have been inefficient.

Accordingly, it is an object of an aspect of the present embodiment to enable executing ring switching processing for each wavelength while suppressing the increase in size of the device, and to enable effective use of the transmission path resource.

2. First Embodiment

An optical transmission device and optical transmission network system according to the first embodiment will be described.

2-1. Configuration of APS Control Information

First, a configuration example of APS control information processed by the optical transmission device relating to the first embodiment will be described.

2-1-1. Configuration Example of APG Control Information 600

FIG. 6 is a diagram illustrating an example of a format configuration of APS configuration information 600 relating to the first embodiment.

As illustrated in FIG. 6, the APG control information 600 applies to WDM, thereby including multiple pieces of divided APS control information provided corresponding to each of multiple different wavelengths ($\lambda 1$ through $\lambda n$). The multiple pieces of divided APS control information include a Request field (bits 1 through 4 of byte 1) and a representative wavelength flag field (bit 8 of byte 4).

The Request field is a region that stores information indicating a switching request of the ring switching processing corresponding to each of the wavelengths. In the Request field, for example, in the case of requesting ring switching processing to be executed, "SF" (Signal Fail) is stored, and in the case of requesting normal connecting processing to be executed (not requesting ring switching processing to be executed), "NR" (No Request) is stored.

The representative wavelength flag field is a region that stores information indicating that a wavelength is the wavelength selects from the multiple wavelengths ($\lambda 1$ through $\lambda n$) as a representative wavelength. In the representative wavelength flag field of the divided APS control information corresponding to the representative wavelength ($\lambda 1$ in FIG. 6), "1" is stored, and in the representative wavelength flag field corresponding to a wavelength other than the representative wavelength ($\lambda 2$ through $\lambda n$ in FIG. 6), "0" is stored.

Also, in the one wavelength selected from multiple wavelengths (selected wavelength, $\lambda 1$ in FIG. 6), the divided APS control information further includes a S/L field (bit 5 of byte 1), State field (bits 6 through 8 of byte 1), Requested Node ID field (bits 1 through 8 of byte 2), and Source Node ID field (bits 1 through 8 of byte 3).

The S/L field is a region that stores information indicating the transmitting path within the OTN ring network of the APS control information, and information indicating whether the transmitting route is a Short Path within the OTN ring network or is a Long Path is stored therein. A Short Path is a path connecting the originating node and destination node of the APS control information without transmitting via another node, and is a shorter path of the OTN ring network. A Long Path is a path connecting the originating node and destination node of the APS control information via another node, and is a longer path of the OTN ring network.

The State field is a region that stores information indicating the switching state of the ring switching processing, and information indicating states such as Idle, Bridge, and Switch are stored therein.

The Requested Node ID field is a region that stores distinguishing information indicating the destination node of the APS control information, and stores distinguishing information indicating one of the switching nodes in the ring switching processing.

The Source Node ID field is a region that stores distinguishing information indicating the emission node of the APS control information, and stores distinguishing information indicating the other switching node in the ring switching processing.

In the selected wavelength ($\lambda 1$), the remaining regions (bits 1 through 8 of byte 4) of the divided APS control information are Reserved fields. A Reserved field is a region that is currently unused but is reserved for here hereafter.

Also, in the wavelengths other that the selected wavelength ($\lambda 1$), the remaining regions (bits 5 through 8 of byte 1, all bits of bytes 2 through 4) become Reserved fields.

As described above, the APS control information 600 which stores information indicating a switching request of the ring switching processing for each wavelength is to transmit/receive between the optical transmission devices of each node, whereby ring switching processing may be selectively executed for each wavelength in the optical transmission devices of each node. Therefore, since ring switching processing may be selectively executed in a certain OTN ring where a failure has occurred, the transmission path resource in the OTN ring network may be effectively used. Also, unnecessary ring switching processing may be suppressed from occurring in the optical transmission devices at the nodes, whereby the time during which the ring is cut off, in accordance with the ring switching processing, may be suppressed to a minimum at each node.

2-1-2. Configuration Example of OTN Frame

The APS control information 600 illustrated in FIG. 6 is stored in an OTN frame of an optical signal having the one wavelength selected from the multiple wavelengths (representative wavelength). The APS control information 600 includes the multiple pieces of divided APS control information corresponding to the multiple wavelengths ($\lambda 1$ through $\lambda n$), but the transmission thereof is performed by one optical signal having the representative wavelength. That is to say, the APS control information 600 is transmitted to the optical transmission devices positioned at the nodes within the OTN ring network by the one optical signal having the representative wavelength.

Also, the OTN frame uses a multi-frame configuration, and the APS control information 600 is dispersed and stored in an ODU overhead which is included in the multiple OTN frames in a multi-frame configuration, as one circuit of the divided APS control information for each wavelength. The APS control information 600 transmits multiple optical signals that include an OTN frame in which the divided APS control information pieces are stored, in a time-division manner, thereby transmitting to the optical transmission devices positioned at the nodes within the OTN ring network.

Figure 7:
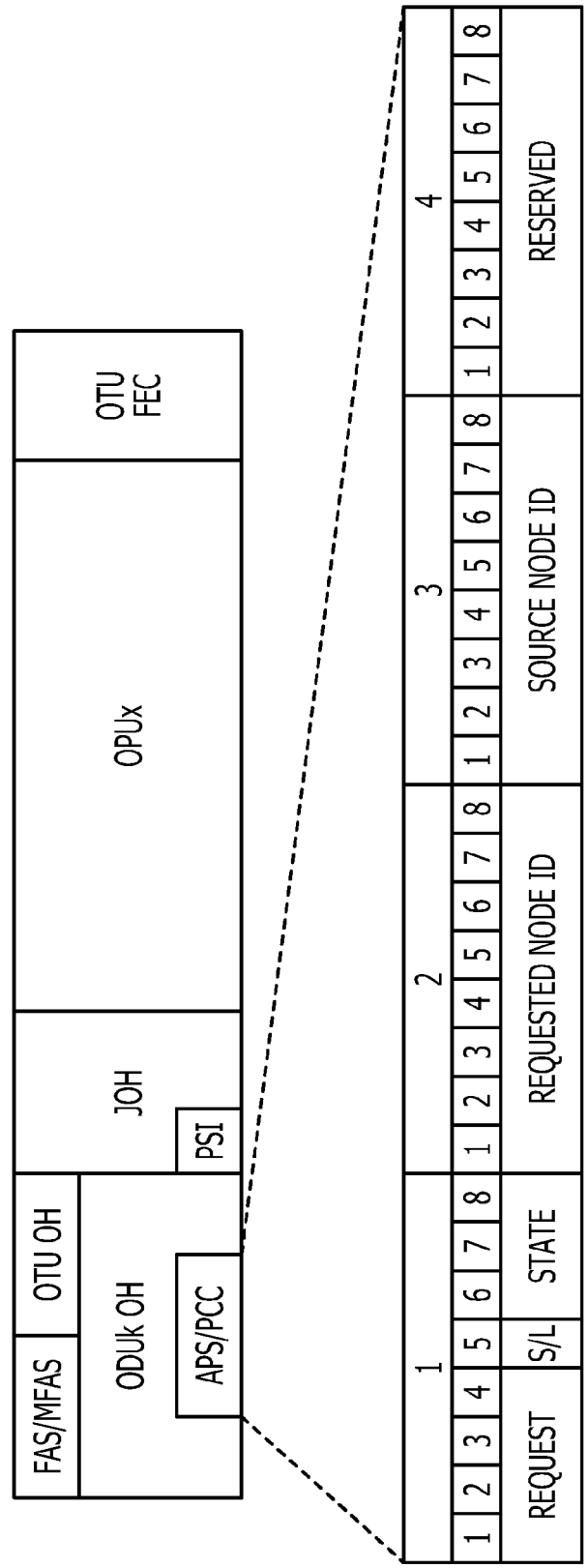
FIG. 7 is a diagram illustrating a configuration example of an OTU frame including APS control information.

FIG. 7 is a diagram illustrating a configuration of an OTN frame including the APS control information. As illustrated in FIG. 7, in a frame configuration (upper level in FIG. 7) of an OTN frame included in the optical signal of the representative wavelength, one piece of divided PAS control information that makes up the APS control information 600 is inserted in the ODU overhead (ODUk OH). FIG. 7 illustrates an example of the divided APS control information corresponding to the wavelength $\lambda 1$ being stored in a given field within the ODU overhead, in the APS control information 600 (lower level in FIG. 7).

Note that the APS control information 600 illustrated in FIG. 6 may be obtained by extracting the corresponding divided APS control information from the respective multiple OTN frames, and joining the multiple extracted divided APS control information pieces. This is because the divided APS control information is dispersed within multiple OTN frames having a multi-frame configuration.

As described above, the APS control information 600 that stores information indicating a switching request of the ring switching processing by wavelength is transmitted/received between the optical transmission devices of the nodes, whereby the APS processors equaling the number of the multiple optical signal wavelengths do not have to be provided, and the optical transmission devices may be suppressed from becoming larger in scale.

2-2. Configuration and Operation of Optical Transmission Device

Next, a configuration example and operation example of the optical transmission device relating to the first embodiment will be described.

Figure 8:
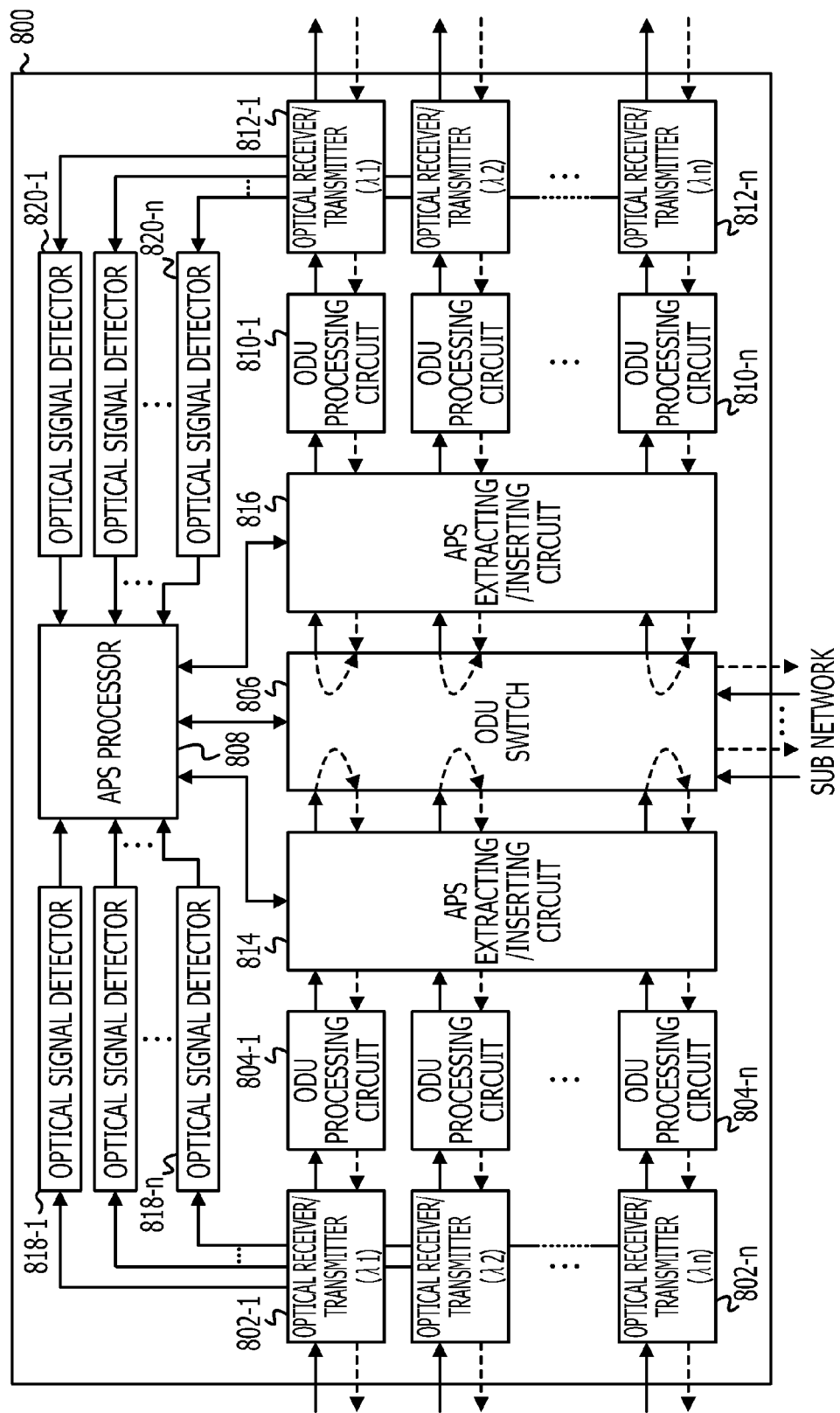
FIG. 8 is a diagram illustrating a configuration example of an optical transmission device relating to the first embodiment.

FIG. 8 is a diagram illustrating a configuration of an optical transmission device 800 relating to the first embodiment.

The optical transmission device 800 illustrated in FIG. 8 includes optical receiver/transmitters 802-1 through 802-n (n is the number of optical signal wavelengths), ODU processing circuits 804-1 through 804-n, ODU switch 806, APS processor 808, ODU processing circuits 810-1 though 810-n, optical receiver/transmitters 812-1 through 812-n, APS extracting/inserting circuits 814 and 816, and optical signal detectors 818-1 through 818-n and 820-1 through 820-n. The optical transmission device 800 corresponds to the optical transmitting devices 102-1 through 102-4 in the OTN ring network 100 illustrated in FIG. 1.

The optical receiver/transmitters 802-1 through 802-n and optical receiver/transmitters 812-1 through 812-n, are realized by hardware such as a photodiode that receives an optical signal from a fiber optic cable and converts this to an electrical signal, a light-emitting diode or laser diode that transmits the optical signal converted into an electrical signal to a fiber optic cable, analog circuit, digital electronic circuit, processor, memory, and so forth, for example. Also, the ODU processing circuits 804-1 through 804-n, ODU switch 806, APS processor 808, ODU processing circuits 810-1 though 810-n, APS extracting/inserting circuits 814 and 816, and optical signal detectors 818-1 through 818-n and 820-1 through 820-n are realized by hardware such as a digital electronic circuit, processor, memory, and so forth, for example. It goes without saying that the parts herein may be realized by sharing hardware, or may be realized by individual hardware.

Now, the digital electronic circuit includes an ASIC (Application Specific Integrated Circuit), FPGA (Field-Programming Gate Array), LSI (Large Scale Integration), and so forth, for example. The processing includes a CPU (Central Processing Circuit) or DSP (Digital Signal Processor), for example. The memory includes RAM (Random Access Memory) or ROM (Read Only Memory), for example.

2-2-1. Operation in Case of Receiving APS Control Information from Other Nodes The optical receiver/transmitters 802-1 through 802-n each have a different wavelength (λ1 through λn) from the optical transmission devices positioned in the adjacent nodes within the OTN ring networks that use WDM, and receive multiple optical signals that have been multiplexed. Now, the multiple optical signals each include OTN frames in a multi-frame configuration. Also, the optical signals having the representative wavelength include the divided APS control information for each wavelength making up the APS control information 600 in the ODU overhead thereof, as illustrated in FIGS. 6 and 7.

The optical receiver/transmitters 802-1 through 802-n each convert the received optical signals to electrical signals, and output these as OTN frame signals to the corresponding ODU processing circuits 804-1 through 804-n. Also, the optical receiver/transmitters 802-1 through 802-n each receive the OTN frame signals from the ODU processing circuits 804-1 through 804-n, convert the received electrical signals into multiple optical signals having different wavelengths, and transmit these to the optical transmission devices positioned at adjacent nodes.

The ODU processing circuits 804-1 through 804-n each receive the OTN frame signals from the corresponding optical receiver/transmitters 802-1 through 802-n, and extract the ODU included in the OTN frames of the received signal. The ODU processing circuits 804-1 through 804-n each receive an OTN frame signal from the APS extracting/inserting circuit 814, and supply these to the corresponding optical receiver/transmitters 802-1 through 802-n.

The APS extracting/inserting circuit 814 receives the OTN frame signals from the ODU processing circuits 804-1 through 804-n, and outputs the received OTN frame signals to the ODU switch 806. Additionally, in the OTN frame of the OTN frame signal corresponding to the representative wavelength, the APS extracting/inserting circuit 814 extracts the divided APS control information included in the ODU overhead thereof. The APS extracting/inserting circuit 814 supplies the extracted divided APS control information to the APS processor 808. Also, the APS extracting/inserting circuit 814 receives the OTN frame signals from the ODU switch 806, and outputs the received OTN frame signals to the corresponding ODU processing circuits 804-1 through 804-n.

The APS processor 808 receives the extracted divided APS control information from the APS extracting/inserting circuit 814. The received optical signal has OTN frames in a multi-frame configuration, whereby the APS processor 808 receives the multiple pieces of divided APS control information making up the APS control information 600 in a time-division manner from the APS extracting/inserting circuit 814. The APS processor 808 joins the received multiple divided APS control information pieces, thereby generating APS control information 600 such as illustrated in FIG. 6.

The APS processor 808 determines whether or not a failure has occurred in the OTN ring network for each wavelength, based on the generated APS control information 600. That is to say, the APS processor 808 confirms whether "SF" (Signal Fail) is stored in the Request field for each wavelength in the APS control information.

In the case that a wavelength in an OTN ring where a failure has occurred, i.e. a wavelength having "SF" stored in the corresponding Request field, exists, the APS processor 808 determines which node is the node positioned on both ends of the transmission path including the failure occurrence location (switching node). That is to say, the APS processor 808 confirms the distinguishing information of the switching node where the requested Node ID field and Source Node ID field corresponding to the selected wavelength (λ1) are stored.

In the case that one of the switching nodes illustrated by the APS control information 600 is an own node (node where the optical transmission device 800 including the APS processor 800 itself is positioned), the APS processor 808 issues ring switching instructions to instruct the ODU switch 806 to execute ring switching processing for the OTN ring where the failure occurred.

The ODU switch 806 executes sing switching processing, selectively for the OTN ring where the failure occurred, based on the ring switching instructions from the APS processor 808. That is to say, in the case that the next transmission destination node of the received optical signals is another switching node, as illustrated by the dotted lines in FIG. 8, the ODU switch 806 executes return processing of the transmission path to switch the transmission destination node to the received optical signal transmission destination node, selectively, from the ODU processing circuits 804-1 through 804-n, for the OTN frame signals output from the ODU processing circuit corresponding to the wavelength of the OTN ring where the failure occurred.

Upon receiving an OTN frame signal from the APS extracting/inserting circuit 814, based on the ring switching instructions from the APS processor 808, in the case that the received OTN frame signal is an output signal from the ODU processing circuit corresponding to the wavelength of the OTN ring where the failure occurred, the ODU switch 806 again outputs the OTN frame signal to the APS extracting/inserting circuit 814.

Also, in the case of not receiving ring switching instructions from the APS processor 808, the ODU switch 806 outputs the OTN frame signal received from the APS extracting/inserting circuit 814 to the APS extracting/inserting circuit 816 without change.

Note that as a result of the determination by the ODU processing circuits 804-1 through 804-n, in the case that the destination node of the received optical signal is a node belonging to a sub network external to the OTN ring network, upon converting the OTN frame signal received by an optical receiver/transmitter, the ODU switch 806 transmits the optical signal having a corresponding OTN frame to the sub network thereof.

The functions and operations of the APS extracting/inserting circuit 816, ODU processing circuits 810-1 through 810-n, optical receivers/transmitters 812-1 through 812-n, and optical signal detectors 820-1 through 820-n are similar to the APS extracting/inserting circuit 814, ODU processing circuits 804-1 through 804-n, optical receivers/transmitters 802-1 through 802-n, and optical signal detectors 818-1 through 818-n, except in the point of the nodes that are subject to transmission/reception of the optical signals.

As described above, with the optical transmission device 800, the divided APS control information included in the OTN frames corresponding to the representative wavelength is extracted in the APS extracting/inserting circuits 814 and 816, and the APS control information 600 is generated by joining the extracted divided APS control information in the APS processor 808, whereby APS processors in the number of multiple wavelengths (λ1 through λn) do not have to be provided, and the optical transmission devices may be suppressed from becoming larger in scale.

Also, with the optical transmission device 800, in the APS processor 808, the wavelength of the OTN ring where the failure occurred may be identified from the multiple wavelengths (λ1 through λn), based on the generated APS control information 600, whereby in the ODU switch 806, the ring switching processing may be executed selectively by the certain OTN ring where the failure occurred. Therefore, according to the optical transmission device 800, performing ring switching processing in a ring where no failure is occurring with normal transmission/reception of optical signals being performed may be suppressed, whereby the resource of the transmission path in the OTN ring network may be effectively used. Also, unnecessary ring switching processing may be suppressed from occurring in the optical transmission devices at the nodes, whereby the time during which the ring is cut off, in accordance with the ring switching processing, may be suppressed to a minimum at each node.

2-2-2. Operation in the Case of Detecting Failure Occurrence in Own Node

On the other hand, the optical signal detectors 818-1 through 818-n each receive a corresponding optical signal from the optical receiver/transmitters 802-1 through 802-n. The optical signal detectors 818-1 through 818-n detect the average strength, within a fixed time period, of the received optical signal for each wavelength.

In the case that the average strength of the detected optical signals are not within a given range, in an OTN ring corresponding to the wavelength of the optical signal thereof, the optical signal detectors 818-1 through 818-n determine that a failure has occurred in the path between its own node (the node where the optical transmission device 800 including the optical signal detectors 818-1 through 818-n themselves is positioned) and the node of the transmission source of the optical signal thereof, and determines that the own node and the transmission source node thereof are the switching nodes in the ring switching processing. The optical signal detectors 818-1 through 818-n, in the case of detecting that a failure has occurred, output a failure alarm signal to the APS processor 808.

The APS processor 808 receives the failure alarm signal from the optical signal detectors 818-1 through 818-n, and determines whether or not a failure is occurring in the corresponding OTN ring for each wavelength, based on the received failure alarm signal. In the case of determining that a failure has occurred in the corresponding OTN ring for a certain wavelength, the APS processor 808 generates APS control information 600 for transmitting, by storing the setting information according to the situation of the occurred failure in each field within the APS control information 600 having the format configuration illustrated in FIG. 6.

The APS processor 808 stores "SF" (Signal Fail) in the Request field corresponding to the wavelength of the OTN ring where the failure has occurred, and stores "NR" (No Request) in the Request field corresponding to a wavelength other than the wavelength of the OTN ring where the failure has occurred. As described above, SF is to request ring switching processing, and NR is to request normal connection processing.

The APS processor 808 stores distinguishing information of its own node (node where optical transmission device 800 including the APS processor 808 itself is positioned) in the Source Node ID field, and the optical signal detectors 818-1 through 818-n store distinguishing information of the transmission source node of the receiving optical signal. As described above, distinguishing information of the switching nodes in the ring switching processing is stored in the Source Node ID field and Requested Node ID field.

Also, in the case that the wavelength of the OTN ring where the failure has occurred is the representative wavelength, the APS processor 808 selects a new normal wavelength where no failure is occurring on the OTN ring as the representative wavelength, and changes the representative wavelength from the current wavelength corresponding to the OTN ring where the failure occurred to the newly selected separate wavelength. Transmission of the APS control information 600 is performed by one optical signal having a representative wavelength, so in the case that a failure occurs in the OTN ring corresponding to the representative wavelength, a normal OTN ring wavelength where no failure is occurring has to be newly secured as the representative wavelength, in order to appropriately transmit the APS control information 600 to the nodes within the OTN ring network.

The APS processor 808 updates the setting information of the representative wavelength flag field in the APS control information 600 illustrated in FIG. 6 when the representative wavelength is changed. The APS processor 808 stores "1" in the representative wavelength flag field corresponding to the wavelength selected as the new representative wavelength, and stores "0" in the representative wavelength flag field corresponding to the other wavelengths.

The APS processor 808 outputs the APS control information 600 after the appropriate setting information has been stored and updated to the APS extracting/inserting circuits 814 and 816. At this time, the APS processor 808 outputs the APS control information in the state of being divided into the divided APS control information 600 for each wavelength.

The APS extracting/inserting circuit 814 receives the multiple pieces of divided APS control information that makes up the APS control information 600 from the APS processor 808. As described above, the APS control information 600 is dispersed and stored in multiple OTN frames in a multi-frame configuration, and is transmitted by multiple optical signals including the multiple OTN frames thereof in a time-division manner. Therefore, in an OTN frame of multiple OTN frame signals corresponding to the representative wavelength, the APS extracting/inserting circuit 814 sequentially inserts the received multiple pieces of divided APS control information in the ODU overhead thereof. The APS extracting/inserting circuit 814 sequentially outputs the OTN frame signals into which the divided APS control information has been inserted, sequentially in the ODU processing circuits 804-1 through 804-n corresponding to the representative wavelength.

The functions and operations of the APS extracting/inserting circuit 816 are also the same as those of the APS extracting/inserting circuit 814.

The optical receiver/transmitters 802-1 and 812-1 corresponding to the representative wavelength $\lambda 1$ sequentially receives the corresponding OTN frame signals from the ODU processing circuits 804-1 and 810-1, and sequentially convert the received electrical signals into an optical signal having the representative wavelength $\lambda 1$, and outputs this. Thus, the APS control information 600 is transmitted to the optical transmission devices positioned on adjacent nodes by optical signals having the representative wavelength $\lambda 1$.

In addition to the generation and inserting processing of the APS control information 808 described above, in the case of determining that a failure has occurred in the OTN ring corresponding to a certain wavelength, the APS processor 808 issues ring switching instructions that instructs the ODU switch 806 to execute ring switching processing.

The ODU switch 806 executes ring switching processing selectively for the OTN ring where the failure has occurred, based on the ring switching instructions from the APS processor 808. That is to say, in the case that the optical signal detectors 818-1 through 818-n detect a failure occurring, the ODU switch 806 executes return processing of the transmission path, selectively for the OTN frame signals output from the ODU processing circuit corresponding to the wavelength of the OTN ring where the failure has occurred, from the ODU processing circuits 804-1 through 804-n, as illustrated by the dotted lines in FIG. 8. Also, in the case that the optical signal detectors 818-1 through 818-n detect a failure occurring, the ODU switch 806 executes return processing of the transmission path, selectively for the OTN frame signals output from the ODU processing circuit corresponding to the wavelength of the OTN ring where the failure has occurred, from the ODU processing circuits 804-1 through 804-n, as illustrated by the dotted lines in FIG. 8.

As described above, with the optical transmission device 800, determination is made by the optical signal detectors 818-1 through 818-n whether or not a failure has occurred, individually, for the multiple optical signals corresponding to the multiple wavelengths ($\lambda 1$ through $\lambda n$), whereby with the APS processor 808, the wavelength of the OTN ring where the failure had occurred is identified from the multiple wavelengths, and the divided APS control information that makes up the APS control information 600 is sequentially generated, whereby APS processors in the number of multiple wavelengths ($\lambda 1$ through $\lambda n$) do not have to be provided, and the optical transmission devices may be suppressed from becoming larger in scale.

Also, with the optical transmission device 800, ring switching processing may be executed with the ODU switch 806, selectively for the certain OTN ring where the failure has occurred, whereby ring switching processing in a ring where no failure is occurring with normal transmission/reception of optical signals being performed may be suppressed. Therefore, according to the optical transmission device 800, the resource of the transmission path in the OTN ring network may be effectively used. Also, unnecessary ring switching processing may be suppressed from occurring, whereby the time during which the ring is cut off, in accordance with the ring switching processing, may be suppressed to a minimum at each node.

Also, with the optical transmission device 800, in the case that the wavelength of the OTN ring where the failure had occurred is the representative wavelength, processing is executed to change the normal OTN ring wavelength where no failure has occurred, whereby even in the case wherein a failure occurs in an OTN ring corresponding to the representative wavelength, the APS control information 600 that stores the information indicating the switching request for the ring switching processing may be securely transmitted/exchanged between the optical transmission devices of the nodes. Therefore, the optical transmission devices of the nodes may constantly accurately recognize whether or not there is a switching request for ring switching processing for each wavelength.

2-3. Ring Switching Processing in the Case of Failure Occurring in Optical Signal Having Multiple Wavelengths Between Adjacent Nodes Next, the ring switching processing executed in the OTN ring network 100 will be described divided into several examples.

An operating example of the ring switching processing in the case that a failure has occurred in an optical signal having multiple wavelengths between adjacent nodes, based on an example of a failure occurring which is the fiber optic cable between nodes B and C being disconnected, but in the case that similar failure occurs for another reason, the operations of the ring switching processing is the same. For example, with the optical transmission device 800 positioned at node B, a case wherein the optical receiver/transmitter corresponding to two or more wavelengths on the node C side has broken down at the same time may be considered as another reason.

2-3-1. Processing of Optical Transmission Device

Figure 9:
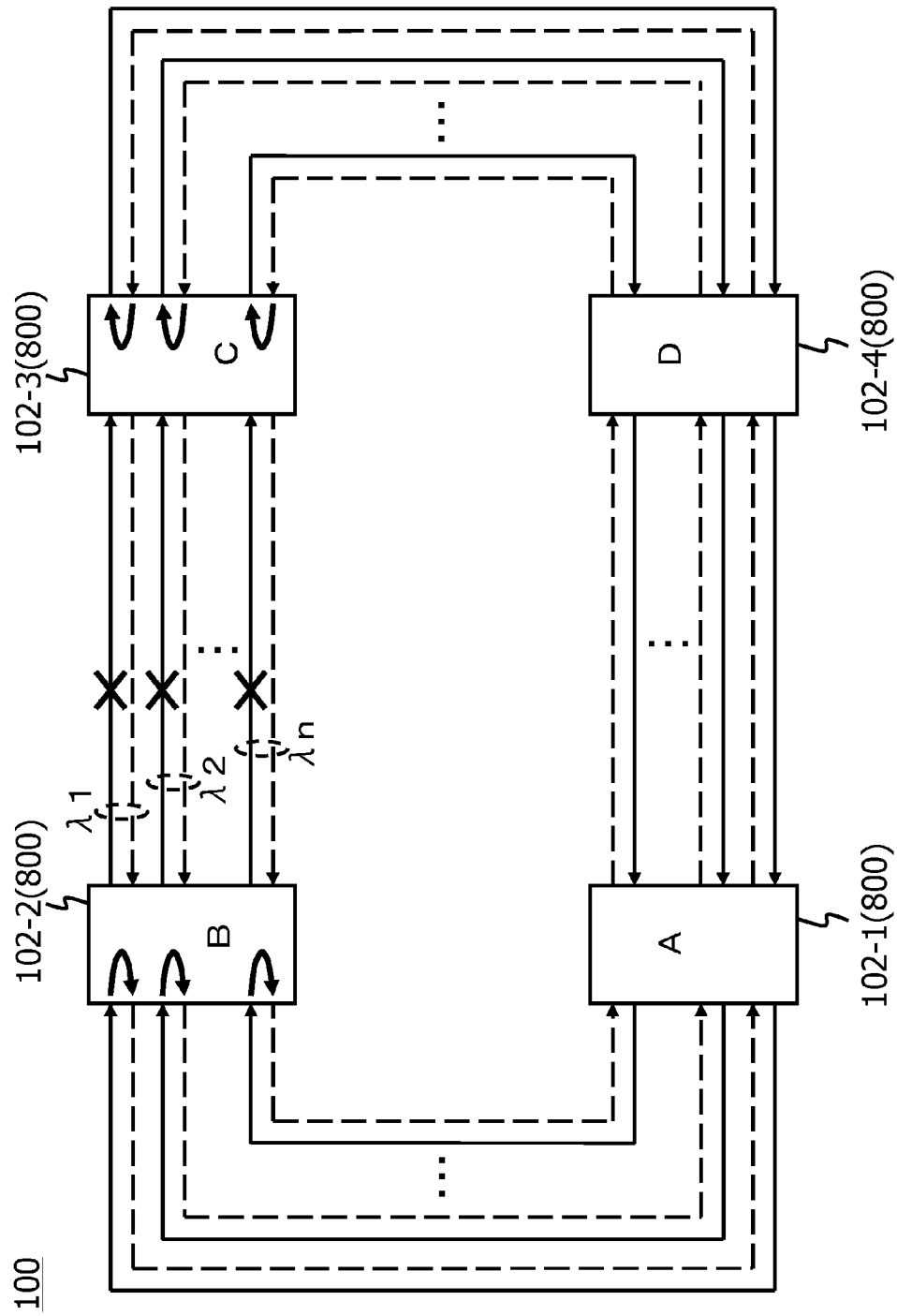
FIG. 9 is a diagram to describe a ring switching processing in the case that an optical fiber cable which connects node B and node C is disconnected.

FIG. 9 is a diagram to describe the ring switching processing in the case that a disconnection of the fiber optic cable connecting nodes B and C has occurred.

The example illustrated in FIG. 9 describes an example of a fiber optic cable that connects nodes B and C in the OTN ring network 100, and a failure has occurred wherein the cable that transmits the optical signals in the direction from node B to node C has broken down. The optical transmission device 800 illustrated in FIG. 8 is provided to the nodes on the OTN ring network 100. Also, the optical transmission devices 800 of the nodes use the wavelength $\lambda 1$ as the representative wavelength out of multiple wavelengths ($\lambda 1$ through $\lambda n$), so as to exchange the APS control information 600 illustrated in FIG. 6 with each other by the optical signal having the representative wavelength $\lambda 1$.

In this case, the transmission processing of the APS control signal and ring switching processing described below are executed with the optical transmission device 800 positioned at node C.

Since the cable that transmits optical signals from the direction of node B towards node C is disconnected, at the optical transmission device 800 positioned at node C, none of the optical receiver/transmitters 802-1 through 802-n on the node B side may receive all of the wavelength ($\lambda 1$ through $\lambda n$)

optical signals in a normal manner from the optical transmission device positioned at node B.

Therefore, the optical signal detectors 818-1 through 818-n may only detect the average strength not in the given range for the optical signals of all the wavelengths. Consequently, the optical signal detectors 818-1 through 818-n output a failure alarm signal to the APS processor 808, indicating that a failure has occurred for all of the optical signal wavelengths.

The APS processor 808 receives the failure alarm from the optical signal detectors 818-1 through 818-n. The APS processor 808 determines that a failure has occurred between nodes B and C in the OTN ring corresponding to all the wavelengths, based on the received failure alarm, and stores the setting information according to the situation of the failure in each of the fields in the APS control information 600 having the format configuration illustrated in FIG. 6.

Now, the setting information of the APS control information 600 will be described.

FIG. 10 is a diagram describing the setting example of the APS control information 1000 in the case that a fiber optic cable that connects nodes B and C is disconnected.

The APS processor 808 stores "SF" (Signal Fail) in the Request field corresponding to all of the wavelengths (λ1 through λn), for example. As described above, SF is information indicating a request for ring switching processing.

Alternatively, the APS processor 808 may instead store "SF-all" (Signal Fail-all) in the Request field corresponding to the selected wavelength (1 in the APS control information 1000 illustrated in FIG. 6), for example. SF-all is information indicating a request for ring switching processing for an OTN ring corresponding to all of the wavelengths.

Further, the APS processor 808 stores distinguishing information indicating node C, which is its own node (node where the optical transmission device 800 including the APS processor 808 itself is positioned), in the Source Node ID field as a switching node in the ring switching processing, and stores the distinguishing information of node B, which is the other switching node, in the Requested Node ID field.

Also, in the example illustrated in FIG. 9, the wavelength λ1 is used as the representative wavelength, whereby the APS processor 808 stores "1" in the representative wavelength flag field corresponding to the wavelength λ1, and stores "0" in the representative wavelength flag field of a wavelength other than the wavelength λ1.

Also, the APS processor 808 stores "S" in the S/L field in the APS control information 1000 that transmits from node C (own node) in the direction denoted by a broken line arrow in FIG. 9. This is so that there are no other nodes between node B which is the destination node of the APS control information and node C which is the originating node, and the transmission path of the APS control information becomes a Short Path. On the other hand, the APS processor 808 stores "L" in the S/L field in the APS control information 1000 that transmits from node C (own node) in the direction denoted by a solid line arrow in FIG. 9. This is so that nodes D and A exist between node B which is the destination node of the APS control information and node C which is the originating node, and the transmission path of the APS control information becomes a Long Path.

Also, the APS processor 808 stores information indicating the state such as "Br" (Bridge) or "Sw" (Switch), according to the switching state of the OTN ring in the switching node.

Now, returning to FIG. 9, description of the processing executed by the optical transmission device 800 positioned at node C will be continued.

The APS processor 808 outputs the APS control information 1000, after appropriate setting information is stored, to the APS extracting/inserting circuit 814 and 816. The optical receiver/transmitters 802-1 and 812-1 corresponding to the representative wavelength λ1 receive the corresponding OTN frame signals from the ODU processing circuits 804-1 and 810-1, convert the received electrical signal into an optical signal having the representative wavelength λ1, and output this. Thus, the optical transmission device 800 transmits the APS control information 1000 illustrated in FIG. 10 to the optical transmission devices positioned at adjacent nodes B and D, by the optical signal having the representative wavelength λ1.

Additionally, the APS processor 808 issues ring switching instructions to the ODU switch 806 to execute ring switching processing for all of the wavelengths.

The ODU switch 806 executes ring switching processing for all of the OTN rings, based on the ring switching instructions from the APS processor 808. That is to say, the ODU switch 806 executes return processing of the transfer path for all of the OTN frame signals output by the ODU processing circuits 810-1 through 810-n on the node D side. Thus, the optical transmission device 800 positioned at node C executes return processing of the transfer path in order to switching the next transmission destination of the optical signal from note B to node D, for all of the multiple OTN rings together.

On the other hand, with the optical transmission device 800 positioned at node B, the ring switching processing described below is executed.

With the optical transmission device 800 positioned at node B, for example, the optical receiver/transmitter 812-1 receives the APS control information 1000 by receiving an optical signal having the representative wavelength λ1 from node C via a short path (without transmitting via another node). Further, the optical receiver/transmitter 802-1 receives the APS control information 1000 illustrated in FIG. 10 by receiving an optical signal having the representative wavelength λ1 from node C via a long path (via nodes D and A). The APS processor 808 recognizes that a failure has occurred in all of the wavelengths in the OTN ring network 100, based on the received PAS control information 1000, and recognizes that the failure thereof is occurring between the its own node (node B) and the adjacent node C, and that its own node is specified as the switching node in the ring switching processing. Consequently, the APS processor 808 executes ring switching instructions to the ODU switch 806 to execute ring switching processing for all of the wavelengths.

The ODU switch 806 executes ring switching processing for all of the OTN rings, based on ring switching instructions from the APS processor 808. That is to say, the ODU switch 806 executes return processing of the transmission path for all of the OTN frame signals output from the ODU processing circuit 804-1 through 804-n on the node A side. Thus, the optical transmission device 800 positioned at node B executes return processing of the transmission path in order to switching the next transmission destination of the optical signal from note C to node A, for all of the multiple OTN rings together.

As described above, in the case that a failure has occurred in the optical signal having multiple wavelengths between adjacent nodes, the optical transmission devices positioned on the adjacent nodes thereof may transmit APS control information indicating that a failure has occurred in all of the wavelengths, and further execute ring switching processing for all of the multiple OTN rings, thereby appropriately resolving the failure.

2-3-2. Sequence of Ring Switching Processing

Next, an example of a sequence of ring switching processing will be described.

Figure 11:
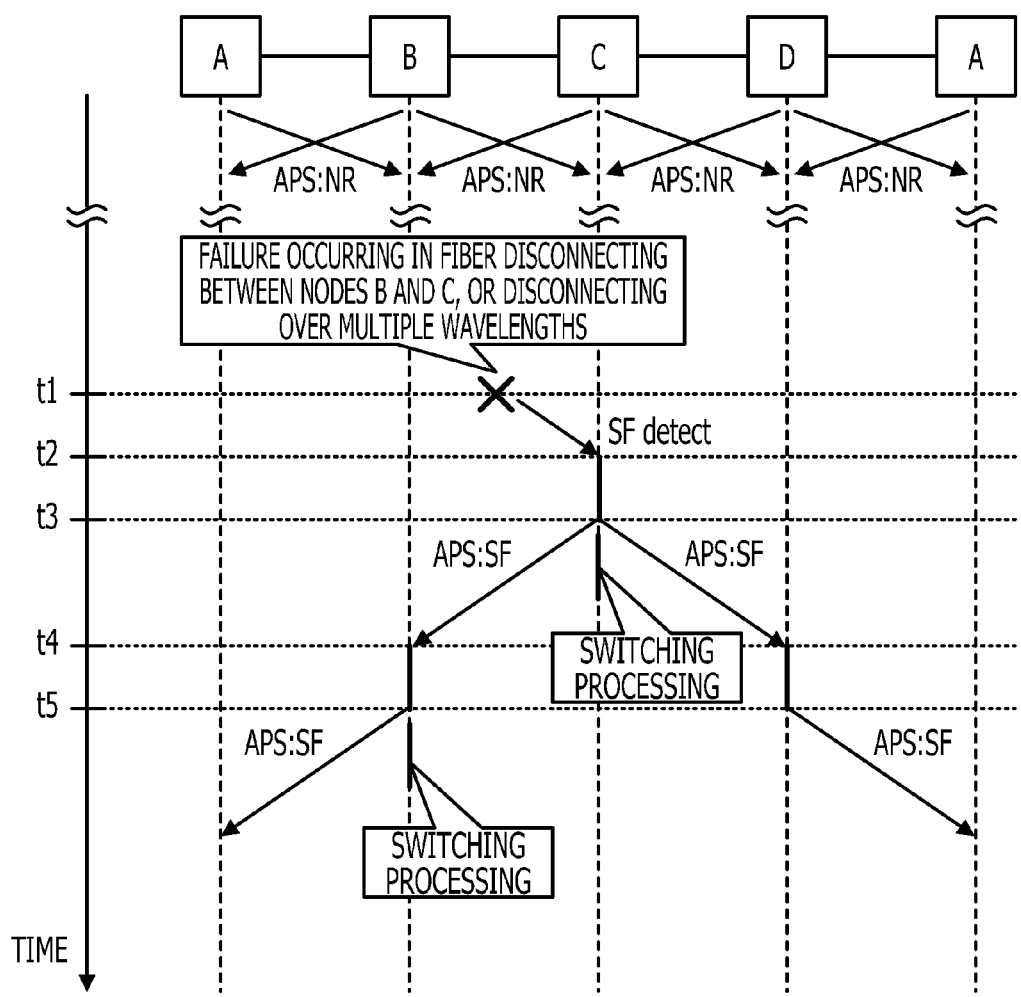
FIG. 11 is a diagram illustrating an example of a ring switching processing sequence in the case that an optical fiber cable which connects node B and node C is disconnected.

FIG. 11 is a diagram illustrating an example of a ring switching processing sequence in the case that a fiber optic cable that connects nodes B and C is disconnected.

As illustrated in FIG. 11, with the OTN ring network 100, during a time period in which no failure is occurring between any of the nodes (before point-in-time t1), the optical transmission devices 800 transmit APS control information wherein "NR" (No Request) is stored in the Request field corresponding to all of the wavelengths ($\lambda 1$ through $\lambda n$), with each other between adjacent nodes. As described above, NR is information indicating a request for normal connection processing. Thus, the optical transmission devices for each node do not execute ring switching processing, but executes normal connection processing.

Conversely, at point-in-time t1, in the case that a failure has occurred such as the fiber optic cable connecting nodes B and C being disconnected, at point-in-time t2, the optical transmission circuit 800 positioned at node C determines that a failure has occurred between nodes B and C in the OTN ring corresponding to all of the wavelengths (SF detect), and determines that its own node (node C) and node B are the switching nodes in the ring switching processing. Subsequently, as illustrated in FIG. 10, the optical transmission device 800 of node C stores appropriate setting information in the fields of the APS control information 600.

Next, at point-in-time t3, the optical transmission device 800 at node C transmits the APS control information 1000 illustrated in FIG. 10 to the optical transmission devices positioned at adjacent nodes B and D, by the optical signals having the representative wavelength $\lambda 1$. Subsequently, the optical transmission device 800 executes return processing of the transmission path in order to switch the next transmission destination node of the optical signal to node D instead of node B, for all of the multiple OTN rings together, thereby executing ring switching processing for all of the multiple OTN rings.

Next, at point-in-time t4, the optical transmission device 800 at node B receives the APS control information 1000 illustrated in FIG. 10 from node C, by the optical signals having the representative wavelength $\lambda 1$. As described in FIG. 9, the optical transmission device 800 at node B recognizes that a failure has occurred between nodes B and C in the OTN ring corresponding to all of the wavelengths, based on the received APS control information 1000, and recognizes that its own node is specified as the switching node in the ring switching processing.

Also, similar to the optical transmission device 800 at node D, The APS control information 1000 illustrated in FIG. 10 is received from the optical signal having the representative wavelength $\lambda 1$. Subsequently, the optical transmission device 800 at node D recognizes that a failure has occurred between nodes B and C in the OTN ring corresponding to all of the wavelengths, based on the received APS control information 1000.

Next, at point-in-time t5, the optical transmission device 800 at node B transmits the APS control information 1000 illustrated in FIG. 10 to the optical transmission device positioned at adjacent node A, by the optical signals having the representative wavelength $\lambda 1$. Subsequently, the optical transmission device 800 executes return processing of the transmission path in order to switch the next transmission destination node of the optical signal to node A instead of node C, for all of the multiple OTN rings together, based on the recognition that its own node is the switching node, thereby executing ring switching processing for all of the multiple OTN rings.

Also, the optical transmission device 800 at node D similarly transmits the APS control information 1000 illustrated in FIG. 10 to the optical transmission device positioned at adjacent node A, by the optical signal having the representative wavelength $\lambda 1$.

Subsequently, the optical transmission device 800 at node A receives the APS control information 1000 illustrated in FIG. 10 from each of nodes B and D, from the optical signals having the representative wavelength $\lambda 1$. The optical transmission device 800 at node A recognizes that a failure has occurred between nodes B and C in the OTN ring corresponding to all of the wavelengths, based on the received APS control information 1000.

As described above, in the case that a failure occurs in an optical signal having multiple wavelengths between adjacent nodes, the optical transmission device of the nodes in an OTN ring network recognize that a failure has occurred in all of the wavelengths of multiple signals, and which node the switching node is in the ring switching processing, through transmission/reception of the APS control signal, whereby ring switching processing is executed for all of the multiple OTN rings together, thereby appropriately resolving the failure.

2-4. Ring Switching Processing in the Case of Failure Occurring in Optical Signal Having Certain Wavelength Other than Representative Wavelength Between Adjacent Nodes An operation example of ring switching processing in the case that a failure occurs in the optical light having a certain wavelength other than the representative wavelength between adjacent nodes will be described, based on an example wherein a failure has occurred in the optical signal having a wavelength $\lambda 2$ other than the representative wavelength $\lambda 1$, but even in the case that a similar failure occurs for another reason, the operations of the ring switching processing is the same. For example, the case of a failure occurring in an optical signal other than wavelengths $\lambda 1$ and $\lambda 2$ may be considered as another reason.

2-4-1. Processing of Optical Transmission Device

Figure 12:
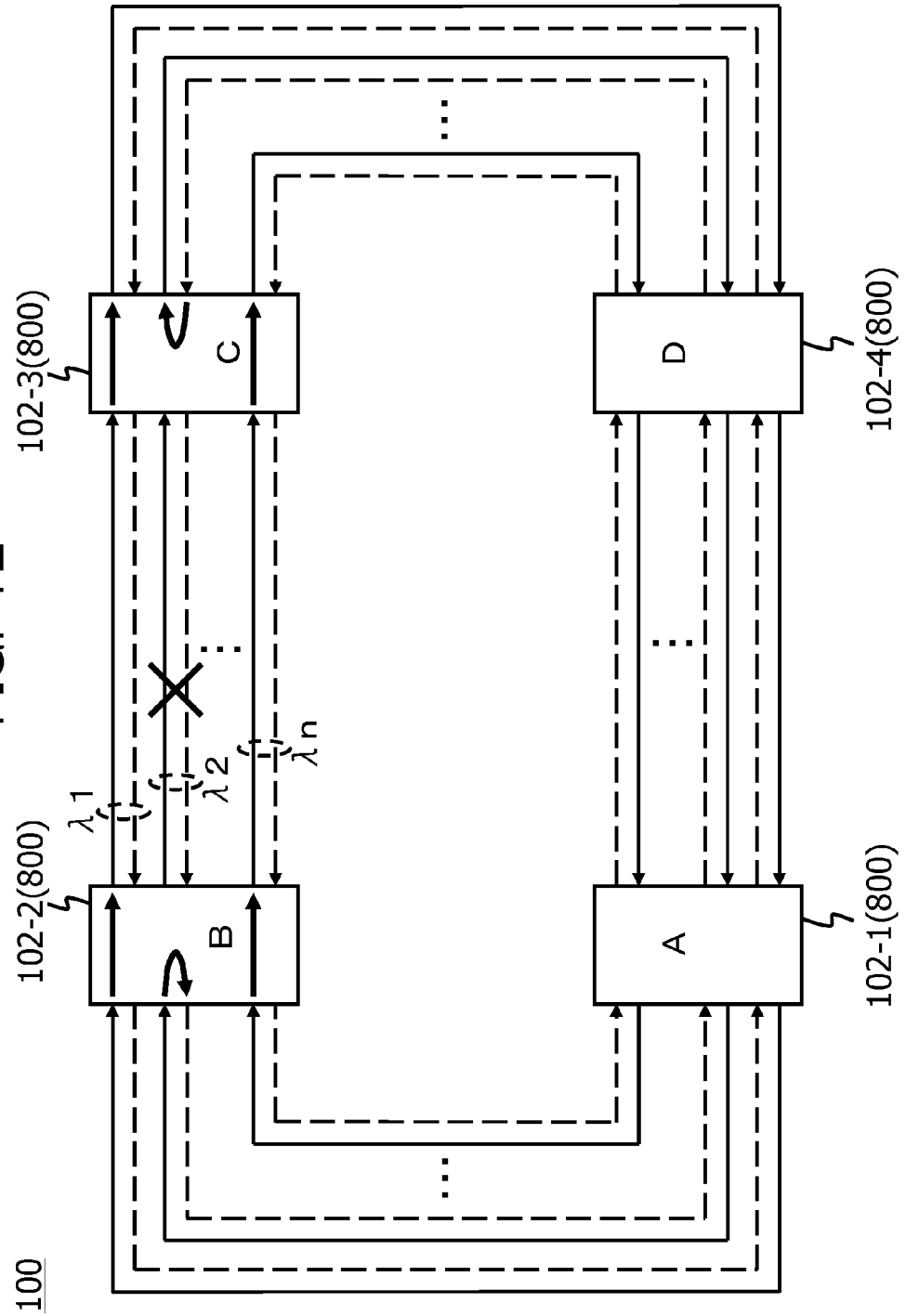
FIG. 12 is a diagram to describe ring switching processing in the case that a failure occurs in the optical signal having a certain wavelength λ2 between node B and node C.

FIG. 12 is a diagram to describe the ring switching processing in the case that a failure occurs in an optical signal having a certain wavelength $\lambda 2$ between nodes B and C.

The example illustrated in FIG. 12 illustrates an example wherein a failure has occurred in an optical signal having a certain wavelength $\lambda 2$ other than the representative wavelength ($\lambda 1$) from multiple wavelengths ($\lambda 1$ through $\lambda n$) between nodes B and C in an OTN ring network. The optical transmission devices 800 illustrated in FIG. 8 are provided to the nodes of the OTN ring network 100. Also, the optical transmission devices 800 of the nodes use the wavelength $\lambda 1$ as the representative wavelength from multiple wavelengths ($\lambda 1$ through $\lambda n$), and exchange the APS control information 600 illustrated in FIG. 6 with each other by the optical signal having the representative wavelength $\lambda 1$. The reason for the failure example illustrated in FIG. 12 may be a case wherein a breakdown has occurred in only the optical receiver/transmitter 812-2 corresponding to the wavelength $\lambda 2$ on the node C side, in the optical transmission device 800 positioned at node B within the OTN ring network 100.

In this case, in the optical transmission device 800 positioned at node C, transmission processing of the APS control signal below and the ring switching processing are executed.

Since a failure is occurring in the optical signal having the certain wavelength $\lambda 2$ at nodes B and C, with the optical transmission device 800 positioned at node C, the optical receiver/transmitter 802-2 on the node B side does not receive the optical signal of the wavelength $\lambda 2$ normally from the optical transmission device positioned at node B.

Therefore, the optical signal detector 818-2 only detects the average strength not within a given range for the optical signal of the wavelength λ2. Consequently, the optical signal detector 818-2 outputs a failure alarm signal indicating that a failure has occurred in the optical signal of the wavelength λ2, and outputs this to the APS processor 808.

The APS processor 808 receives the failure alarm signal from the optical signal detector 818-2. The APS processor 808 determines that a failure has occurred between the nodes B and C in the OTN ring corresponding to the certain wavelength λ2, based on the received failure alarm signal, and stores the setting information according to the situation of the occurring failure in each of the fields in the APS control information 600 which has the format configuration illustrated in FIG. 6.

Now, the setting information of the APS control information 600 will be described.

FIG. 13 is a diagram describing a setting example of the APS control information 600 in the case of a failure occurring in the optical signal having the certain wavelength λ2 between nodes B and C.

The APS processor 808 stores "SF" (Signal Fail) in the Request field corresponding to the certain wavelength λ2, and stores "NR" (No Request) in the Request fields corresponding to wavelengths other than the wavelength λ2, for example. As described above, SF is information indicating a request for ring switching processing, and NR is information to request normal connection processing.

Further, the APS processor 808 stores distinguishing information indicating node C which is its own node (node wherein optical transmission device 800 including the APS processor 808 itself is positioned) in the Source Node ID field, and stores distinguishing information of node B which is the other switching node in the Requested Node ID field.

Also, in the example illustrated in FIG. 12, the wavelength λ1 is used as the representative wavelength, whereby the APS processor 808 stores "1" in the representative wavelength flag field corresponding to the wavelength λ1, and stores "0" in the representative wavelength flag fields for wavelengths other than the wavelength λ1.

Also, the APS processor 808 stores "S" in the S/L field in the APS control information 1300 that transmits from node C (own node) in the direction denoted by a broken line arrow in FIG. 12. This is so that there are no other nodes between node B which is the destination node of the APS control information 1300 and node C which is the originating node, and the transmission path of the APS control information becomes a Short Path. On the other hand, the APS processor 808 stores "L" in the S/L field in the APS control information 1300 that transmits from node C (own node) in the direction denoted by a solid line arrow in FIG. 12. This is so that nodes D and A exist between node B which is the destination node of the APS control information 1300 and node C which is the originating node, and the transmission path of the APS control information becomes a Long Path.

Also, the APS processor 808 stores information indicating the state such as "Br" (Bridge) or "Sw" (Switch), according to the switching state of the OTN ring in the switching node.

Now, returning to FIG. 12, description of the processing executed by the optical transmission device 800 positioned at node C will be continued.

The APS processor 808 outputs the APS control information 1300, after appropriate setting information is stored, to the APS extracting/inserting circuits 814 and 816. The optical receiver/transmitters 802-1 and 812-1 corresponding to the representative wavelength λ1 receive the corresponding OTN frame signals from the ODU processing circuits 804-1 and 810-1, convert the received electrical signal into an optical signal having the representative wavelength λ1, and output this. Thus, the optical transmission device 800 transmits the APS control information 1300 illustrated in FIG. 13 to the optical transmission devices positioned at adjacent nodes B and D, by the optical signal having the representative wavelength λ1.

Additionally, the APS processor 808 issues ring switching instructions to the ODU switch 806 to execute ring switching processing selectively for the certain wavelength λ2.

The ODU switch 806 executes ring switching processing for selectively for the certain wavelength λ2, based on the ring switching instructions from the APS processor 808. That is to say, the ODU switch 806 executes return processing of the transfer path selectively for the OTN frame signals output by the ODU processing circuit 810-2 on the node D side. Thus, the optical transmission device 800 positioned at node C selectively executes return processing of the transfer path in order to switch the next transmission destination of the optical signal from note B to node D, selectively for the OTN ring corresponding to the certain wavelength λ2.

On the other hand, with the optical transmission device 800 positioned at node B, the ring switching processing described below is executed.

With the optical transmission device 800 positioned at node B, for example, the optical receiver/transmitter 812-1 receives the APS control information 1300 by receiving an optical signal having the representative wavelength λ1 from node C via a short path (without transmitting via another node). Further, the optical receiver/transmitter 802-1 receives the APS control information 1300 illustrated in FIG. 13 by receiving an optical signal having the representative wavelength λ1 from node C via a long path (via nodes D and A). The APS processor 808 recognizes that a failure has occurred in the certain wavelength λ2 in the OTN ring network 100, based on the received APS control information 1300, and recognizes that the failure thereof is occurring in the certain wavelength λ2, that the failure thereof is occurring between its own node (node B) and the adjacent node C, and that its own node is specified as the switching node in the ring switching processing. Consequently, the APS processor 808 executes ring switching instructions to the ODU switch 806 to execute ring switching processing for the certain wavelength λ2.

The ODU switch 806 executes ring switching processing for the certain wavelength λ2, based on ring switching instructions from the APS processor 808. That is to say, the ODU switch 806 executes return processing of the transmission path selectively for the OTN frame signals output from the ODU processing circuit 804-2 on the node A side. Thus, the optical transmission device 800 positioned at node B executes return processing of the transmission path in order to switch the next transmission destination of the optical signal from node C to node A, selectively for the OTN rings corresponding to the certain wavelength λ2.

As described above, in the case that a failure has occurred in the optical signal having a certain wavelength other than the representative wavelengths between adjacent nodes, with the optical transmission devices positioned at the adjacent nodes thereof, APS control information indicating that a failure has occurred in the certain wavelength thereof is transmitted, and further the ring switching processing is selectively executed for the OTN rings corresponding to the certain wavelength thereof, whereby the failure may be resolved without performing ring switching processing in rings where optical signals may be transmitted/received normally, and the resource of the transmission path in the OTN ring network may be effectively used. Also, unnecessary ring switching processing may be suppressed from occurring, whereby the time during which the ring is cut off, in accordance with the ring switching processing, may be suppressed to a minimum at each node.

2-4-2. Sequence of Ring Switching Processing

Next, an example of a sequence of ring switching processing will be described.

Figure 14:
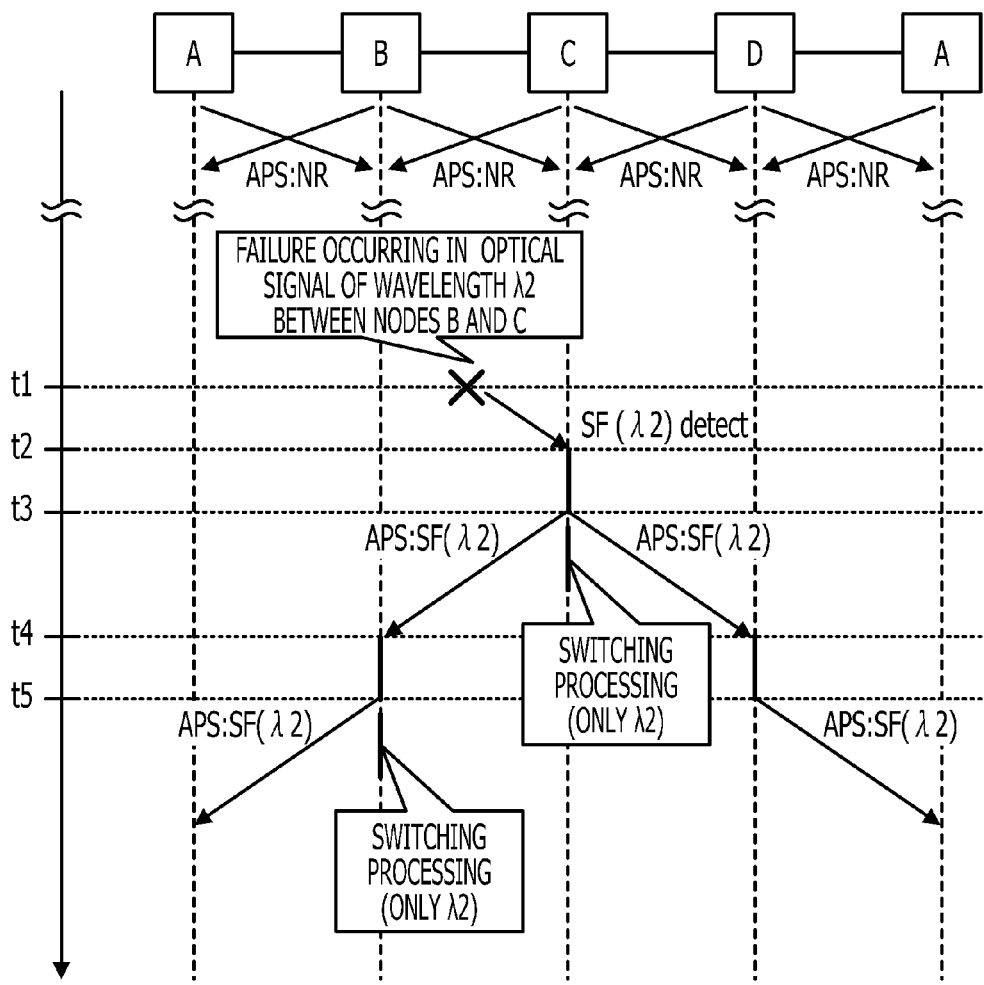
FIG. 14 is a diagram illustrating an example of a ring switching processing sequence in the case that a failure occurs in the optical signal having a certain wavelength λ2 between node B and node C.

FIG. 14 is a diagram illustrating an example of a sequence of ring switching processing in the case that a failure occurs in an optical signal having a certain wavelength $\lambda 2$ between nodes B and C.

As illustrated in FIG. 14, with the OTN ring network 100, during a time period in which no failure is occurring between any of the nodes (before point-in-time t1), the optical transmission devices 800 transmit APS control information, wherein "NR" (No Request) is stored in the Request field corresponding to all of the wavelengths ($\lambda 1$ through $\lambda n$), with each other between adjacent nodes. As described above, NR is information indicating a request for normal connection processing. Thus, the optical transmission devices for each node do not execute ring switching processing, but executes normal connection processing.

Conversely, at point-in-time t1, in the case that a failure has occurred in the optical signal of the certain wavelength $\lambda 2$, at point-in-time t2 the optical transmission circuit 800 positioned at node C determines that a failure has occurred between nodes B and C in the OTN ring corresponding to the certain wavelength $\lambda 2$ (SF ($\lambda 2$) detect), and determines that its own node (node C) and node B are the switching nodes in the ring switching processing, as illustrated in FIG. 12. Subsequently, as illustrated in FIG. 13, the optical transmission device 800 of node C stores appropriate setting information in the fields of the APS control information 600.

Next, at point-in-time t3, the optical transmission device 800 at node C transmits the APS control information 1300 illustrated in FIG. 13 to the optical transmission devices positioned at adjacent nodes B and D, by the optical signals having the representative wavelength $\lambda 1$. Subsequently, the optical transmission device 800 executes return processing of the transmission path in order to switch the next transmission destination node of the optical signal to node D instead of node B, selectively for the OTN ring corresponding to the certain wavelength $\lambda 2$, thereby executing ring switching processing selectively for the OTN ring corresponding to the certain wavelength $\lambda 2$.

Next, at point-in-time t4, the optical transmission device 800 at node B receives the APS control information 1300 illustrated in FIG. 13 from node C, by the optical signals having the representative wavelength $\lambda 1$. As described in FIG. 12, the optical transmission device 800 at node B recognizes that a failure has occurred between nodes B and C in the OTN ring corresponding to the certain wavelength $\lambda 2$, based on the received APS control information 1300, and recognizes that its own node is specified as the switching node in the ring switching processing.

Also, similar to the optical transmission device 800 at node D, the APS control information 1300 illustrated in FIG. 13 is received from node C by the optical signal having the representative wavelength $\lambda 1$. Subsequently, the optical transmission device 800 at node D recognizes that a failure has occurred between nodes B and C in the OTN ring corresponding to the certain wavelength $\lambda 2$, based on the received APS control information 1300.

Next, at point-in-time t5, the optical transmission device 800 at node B transmits the APS control information 1300 illustrated in FIG. 13 to the optical transmission device positioned at adjacent node A, by the optical signals having the representative wavelength $\lambda 1$. Subsequently, the optical transmission device 800 executes return processing of the transmission path in order to switch the next transmission destination node of the optical signal to node A instead of node C, selectively for the OTN ring corresponding to the certain wavelength $\lambda 2$, based on the recognition that its own node is the switching node, thereby executing ring switching processing selectively for the OTN ring corresponding to the certain wavelength $\lambda 2$.

Also, the optical transmission device 800 at node D similarly transmits the APS control information 1300 illustrated in FIG. 13 to the optical transmission device positioned at adjacent node A, by the optical signal having the representative wavelength $\lambda 1$.

Subsequently, the optical transmission device 800 at node A receives the APS control information 1300 illustrated in FIG. 13 from each of nodes B and D, from the optical signals having the representative wavelength $\lambda 1$. The optical transmission device 800 at node A recognizes that a failure has occurred between nodes B and C in the OTN ring corresponding to the certain wavelength $\lambda 2$, based on the received APS control information 1300.

As described above, in the case that a failure occurs in an optical signal having a certain wavelength other than the representative wavelength between adjacent nodes, the optical transmission device of the nodes in an OTN ring network recognize that a failure has occurred in the certain wavelength, and recognizes that information of the switching node in the ring switching processing, through transmission/reception of the APS control signal, whereby ring switching processing is selectively executed for the OTN ring corresponding to the certain wavelength, whereby the failure may be resolved without performing ring switching processing in rings where optical signals may be transmitted/received normally, and the resource of the transmission path in the OTN ring network may be effectively used. Also, unnecessary ring switching processing may be suppressed from occurring, whereby the time during which the ring is cut off, in accordance with the ring switching processing, may be suppressed to a minimum at each node.

2-5. Ring Switching Processing in Case of Failure Occurring in Optical Signal Having Representative Wavelength Between Adjacent Nodes An operation example of ring switching processing in the case that a failure occurs in the optical light having the representative wavelength between adjacent nodes will be described, based on an example wherein a failure has occurred in the optical signal having the representative wavelength $\lambda 1$ between nodes B and C, but even in the case that a similar failure occurs for another reason, the operations of the ring switching processing is the same. For example, the case of a failure occurring in an optical signal having a representative wavelength other than wavelength $\lambda 1$ may be considered as another reason.

2-5-1. Processing of Optical Transmission Device Positioned on Adjacent Nodes

Figure 15:
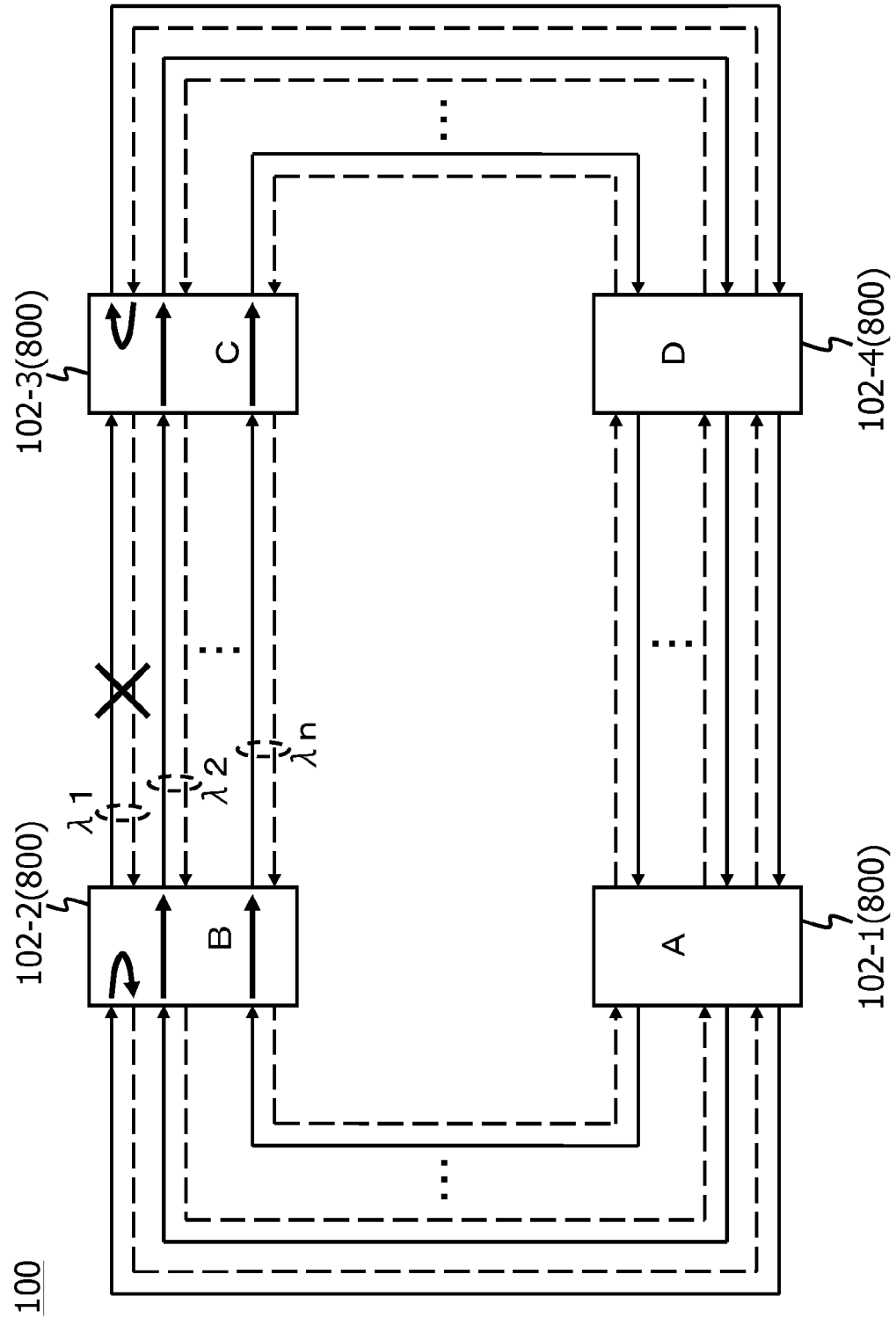
FIG. 15 is a diagram to describe ring switching processing in the case that a failure occurs in the optical signal having a representative wavelength λ1 between node B and node C.

FIG. 15 is a diagram to describe the ring switching processing in the case that a failure occurs between nodes B and C in an optical signal having a representative wavelength $\lambda 1$.

The example illustrated in FIG. 15 illustrates an example wherein a failure has occurred in an optical signal having the representative wavelength $\lambda 1$ from multiple wavelengths ($\lambda 1$ through $\lambda n$) between nodes B and C in an OTN ring network. The optical transmission devices 800 illustrated in FIG. 8 are provided to the nodes of the OTN ring network 100. Also, the optical transmission devices 800 of the nodes use the wavelength λ1 as the representative wavelength from multiple wavelengths (λ1 through λn), and exchange the APS control information 600 illustrated in FIG. 6 with each other by the optical signal having the representative wavelength λ1. The reason for the failure example illustrated in FIG. 15 may be a case wherein a breakdown has occurred in only the optical receiver/transmitter 812-1 corresponding to the representative wavelength λ1 on the node C side, in the optical transmission device 800 positioned at node B within the OTN ring network 100.

In this case, in the optical transmission device 800 positioned at node C, transmission processing of the APS control signal below and the ring switching processing are executed.

Since a failure is occurring in the optical signal having the representative wavelength λ1 at nodes B and C, with the optical transmission device 800 positioned at node C, the optical receiver/transmitter 802-1 on the node B side does not receive the optical signal of the representative wavelength λ1 normally from the optical transmission device positioned at node B.

Therefore, the optical signal detector 818-1 only detects the average strength not within a given range for the optical signal of the representative wavelength λ1. Consequently, the optical signal detector 818-1 outputs a failure alarm signal indicating that a failure has occurred in the optical signal of the representative wavelength λ1, and outputs this to the APS processor 808.

The APS processor 808 receives the failure alarm signal from the optical signal detector 818-1. The APS processor 808 determines that a failure has occurred between the nodes B and C in the OTN ring corresponding to the representative wavelength λ1, based on the received failure alarm signal, and stores the setting information according to the situation of the occurring failure in each of the fields in the APS control information 600 which has the format configuration illustrated in FIG. 6.

Now, the setting information of the APS control information 600 will be described.

FIG. 16 is a diagram describing a setting example of the APS control information 1600 in the case of a failure occurring in the optical signal having the representative wavelength λ1 between nodes B and C.

The APS processor 808 stores "SF" (Signal Fail) in the Request field corresponding to the representative wavelength λ1, and stores "NR" (No Request) in the Request fields corresponding to wavelengths other than the representative wavelength λ1, for example. As described above, SF is information indicating a request for ring switching processing, and NR is information to request normal connection processing.

Further, the APS processor 808 stores distinguishing information indicating node C which is its own node (node wherein optical transmission device 800 including the APS processor 808 itself is positioned) in the Source Node ID field, and stores distinguishing information of node B which is the other switching node in the Requested Node ID field.

Also, in the example illustrated in FIG. 15, since a failure is occurring in the optical signal of the wavelength λ1 which is used as the representative wavelength, the APS processor 808 executes the processing to change the representative wavelength. That is to say, the APS processor 808 selects a normal OTN ring wavelength, where there is no failure, as a new representative wavelength. In the example illustrated in FIG. 16, the APS processor 808 selects the wavelength λ2 as the new representative wavelength, and changes the representative wavelength from the current wavelength λ1 corresponding to the OTN ring where the failure has occurred to the newly selected wavelength λ2. The APS processor 808 stores "1" in the representative wavelength flag field corresponding to the wavelength λ2 selected as the new representative wavelength, and stores "0" in the representative wavelength flag fields corresponding to other wavelengths including the wavelength λ1.

Also, the APS processor 808 stores "S" in the S/L field in the APS control information 1600 that transmits from node C (own node) in the direction denoted by a broken line arrow in FIG. 15. This is so that there are no other nodes between node B which is the destination node of the APS control information 1600 and node C which is the originating node, and the transmission path of the APS control information becomes a Short Path. On the other hand, the APS processor 808 stores "L" in the S/L field in the APS control information 1600 that transmits from node C (own node) in the direction denoted by a solid line arrow in FIG. 15. This is so that nodes D and A exist between node B which is the destination node of the APS control information 1600 and node C which is the originating node, and the transmission path of the APS control information becomes a Long Path.

Also, the APS processor 808 stores information indicating the state such as "Br" (Bridge) or "Sw" (Switch), according to the switching state of the OTN ring in the switching node.

Now, returning to FIG. 15, description of the processing executed by the optical transmission device 800 positioned at node C will be continued.

The APS processor 808 outputs the APS control information 1600, after appropriate setting information is stored, to the APS extracting/inserting circuits 814 and 816. The optical receiver/transmitters 802-2 and 812-2 corresponding to the new representative wavelength λ2 each receive the corresponding OTN frame signals from the ODU processing circuits 804-2 and 810-2, convert the received electrical signal into an optical signal having the new representative wavelength λ2, and output this. Thus, the optical transmission device 800 transmits the APS control information 1600 illustrated in FIG. 16 to the optical transmission devices positioned at adjacent nodes B and D, by the optical signal having the new representative wavelength λ2.

Additionally, the APS processor 808 issues ring switching instructions to the ODU switch 806 to execute ring switching processing selectively for the wavelength λ1 corresponding to the OTN ring where the failure has occurred.

The ODU switch 806 executes ring switching processing selectively for the wavelength λ1, based on the ring switching instructions from the APS processor 808. That is to say, the ODU switch 806 executes return processing of the transfer path selectively for the OTN frame signals output by the ODU processing circuit 810-1 on the node D side. Thus, the optical transmission device 800 positioned at node C selectively executes return processing of the transfer path in order to switch the next transmission destination of the optical signal from note B to node D, selectively for the OTN ring corresponding to the wavelength λ1.

On the other hand, with the optical transmission device 800 positioned at node B, the ring switching processing described below is executed.

With the optical transmission device 800 positioned at node B, for example, the optical receiver/transmitter 812-2 receives the APS control information 1600 by receiving an optical signal having the representative wavelength λ2 from node C via a short path (without transmitting via another node). Further, the optical receiver/transmitter 802-2 receives the APS control information 1600 illustrated in FIG. 16 by receiving an optical signal having the representative wavelength λ2 from node C via a long path (via nodes D and A). The APS processor 808 recognizes that a failure has occurred in the wavelength λ1, which had previously been the representative wavelength, in the OTN ring network 100, based on the received APS control information 1600, and that the representative wavelength has been changed accordingly from λ1 to λ2. Additionally, the APS processor 808 recognizes that the failure thereof is occurring between its own node (node B) and the adjacent node C, and that its own node is specified as the switching node in the ring switching processing. Consequently, the APS processor 808 executes ring switching instructions to the ODU switch 806 to execute ring switching processing for the wavelength λ1.

The ODU switch 806 executes ring switching processing for the wavelength λ1, based on ring switching instructions from the APS processor 808. That is to say, the ODU switch 806 executes return processing of the transmission path selectively for the OTN frame signals output from the ODU processing circuit 804-1 on the node A side. Thus, the optical transmission device 800 positioned at node B executes return processing of the transmission path in order to switch the next transmission destination of the optical signal from node C to node A, selectively for the OTN rings corresponding to the wavelength λ1.

As described above, in the case that a failure has occurred in the optical signal having a representative wavelength between adjacent nodes, with the optical transmission devices positioned at the adjacent nodes thereof, APS control information indicating that a failure has occurred in the representative wavelength thereof is transmitted, and further the ring switching processing is selectively executed for the OTN rings corresponding to the representative wavelength thereof, whereby the failure may be resolved without performing ring switching processing in rings where optical signals may be transmitted/received normally, and the resource of the transmission path in the OTN ring network may be effectively used.

Also, upon the representative wavelength being changed to a different wavelength, the optical transmission devices position at the adjacent nodes thereof transmit the APS control information by an optical signal having the new representative wavelength after changing, whereby the APS control information may be securely transmitted to the optical transmission devices of the nodes in the OTN ring network.

2-5-2. Sequence of Ring Switching Processing

Next, an example of a sequence of ring switching processing will be descried.

Figure 17:
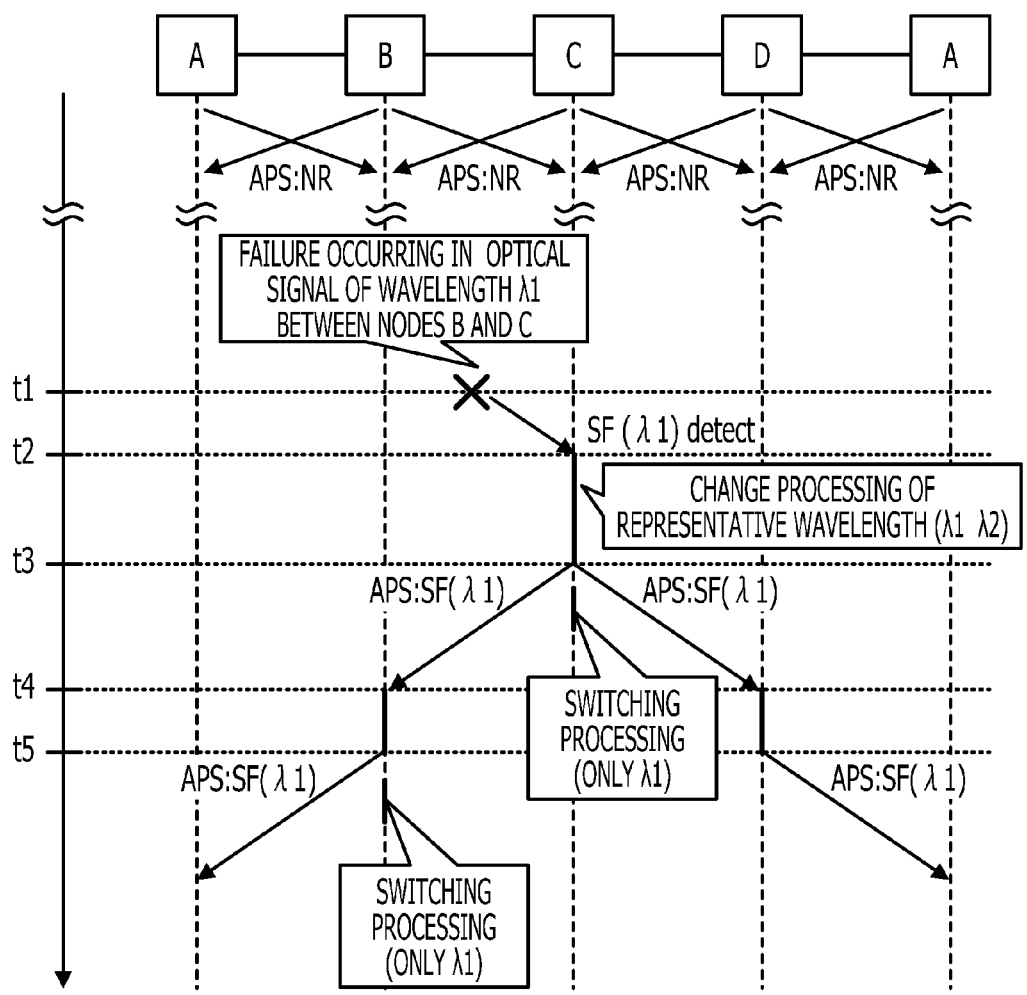
FIG. 17 is a diagram illustrating an example of a ring switching processing sequence in the case that a failure occurs in the optical signal having a representative wavelength λ1 between node B and node C.

FIG. 17 is a diagram illustrating an example of a sequence of ring switching processing in the case that a failure occurs in an optical signal having a representative wavelength λ1 between nodes B and C.

As illustrated in FIG. 17, with the OTN ring network 100, during a time period in which no failure is occurring between any of the nodes (before point-in-time t1), the optical transmission devices 800 transmit APS control information, wherein "NR" (No Request) is stored in the Request field corresponding to all of the wavelengths (λ1 through λn), with each other between adjacent nodes. As described above, NR is information indicating a request for normal connection processing. Thus, the optical transmission devices for each node do not execute ring switching processing, but executes normal connection processing.

Conversely, at point-in-time t1, in the case that a failure has occurred in the optical signal of the representative wavelength λ1, at point-in-time t2 the optical transmission circuit 800 positioned at node C determines that a failure has occurred between nodes B and C in the OTN ring corresponding to the representative wavelength λ1 (SF (λ1) detect), and determines that its own node (node C) and node B are the switching nodes in the ring switching processing. Subsequently, the optical transmission device 800 at node C executes processing to change the representative wavelength. That is to say, the optical transmission device 800 at node C selects the wavelength λ2 of the normal OTN ring as the new representative wavelength where no failure is occurring, and changes the representative wavelength from the current wavelength λ1 corresponding to the OTN ring where the failure has occurred to the newly selected wavelength λ2. Additionally, as illustrated in FIG. 16, the optical transmission device 800 of node C stores appropriate setting information in the fields of the APS control information 600.

Next, at point-in-time t3, the optical transmission device 800 at node C transmits the APS control information 1600 illustrated in FIG. 16 to the optical transmission devices positioned at adjacent nodes B and D, by the optical signals having the new representative wavelength λ2. Subsequently, the optical transmission device 800 at node C executes return processing of the transmission path in order to switch the next transmission destination node of the optical signal to node D instead of node B, selectively for the OTN ring corresponding to the wavelength λ1 which is the previous representative wavelength, thereby executing ring switching processing selectively for the OTN ring corresponding to the wavelength λ1.

Next, at point-in-time t4, the optical transmission device 800 at node B receives the APS control information 1600 illustrated in FIG. 16 from node C, by the optical signals having the representative wavelength λ2. As described in FIG. 15, the optical transmission device 800 at node B recognizes that a failure has occurred between nodes B and C in the OTN ring corresponding to the wavelength λ1 which is the previous representative wavelength, based on the received APS control information 1600, and recognizes that its own node is specified as the switching node in the ring switching processing.

Also, similar to the optical transmission device 800 at node D, the APS control information 1600 illustrated in FIG. 16 is received from the optical signal having the representative wavelength λ2. Subsequently, the optical transmission device 800 at node D recognizes that a failure has occurred between nodes B and C in the OTN ring corresponding to the wavelength λ1, based on the received APS control information 1600.

Next, at point-in-time t5, the optical transmission device 800 at node B transmits the APS control information 1600 illustrated in FIG. 16 to the optical transmission device positioned at adjacent node A, by the optical signals having the representative wavelength λ2. Subsequently, the optical transmission device 800 executes return processing of the transmission path in order to switch the next transmission destination node of the optical signal to node A instead of node C, selectively for the OTN ring corresponding to the wavelength λ1 which is the previous representative wavelength, based on the recognition that its own node is the switching node, thereby executing ring switching processing selectively for the OTN ring corresponding to the wavelength λ1.

Also, the optical transmission device 800 at node D similarly transmits the APS control information 1600 illustrated in FIG. 16 to the optical transmission device positioned at adjacent node A, by the optical signal having the representative wavelength λ2.

Subsequently, the optical transmission device 800 at node A receives the APS control information 1600 illustrated in FIG. 16 from each of nodes B and D, from the optical signals having the representative wavelength λ2. The optical transmission device 800 at node A recognizes that a failure has occurred between nodes B and C in the OTN ring corresponding to the wavelength λ1, based on the received APS control information 1600.

As described above, in the case that a failure occurs in an optical signal having the representative wavelength between adjacent nodes, the optical transmission device of the nodes in an OTN ring network recognize that a failure has occurred in the representative wavelength, and recognizes that information of the switching node in the ring switching processing, through transmission/reception of the APS control signal, whereby ring switching processing is selectively executed for the OTN ring corresponding to the representative wavelength, whereby the failure may be resolved without performing ring switching processing in rings where optical signals may be transmitted/received normally, and the resource of the transmission path in the OTN ring network may be effectively used.

Also, upon the representative wavelength being changed to another wavelength, the APS control information is transmitted to the optical transmission devices on the nodes in the OTN ring network by the optical signals having the new representative wavelength after the change, whereby the APS control information may be accurately transmitted to the optical transmission devices of the nodes in the OTN ring network.

2-6. Modified Example of Optical Transmission Device

Figure 18:
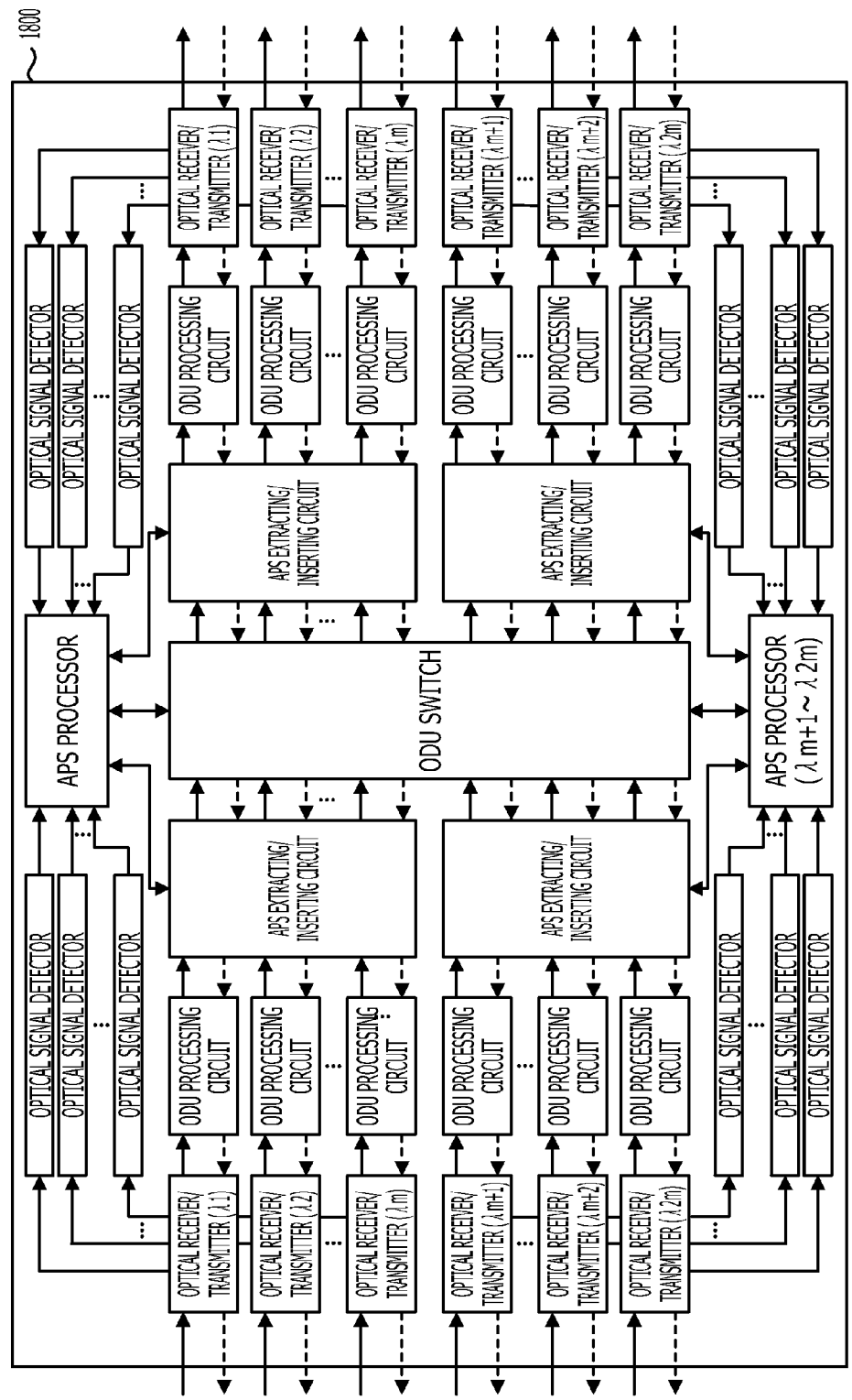
FIG. 18 is a diagram illustrating a modification example of an optical transmission device relating to the first embodiment.

FIG. 18 is an example illustrating a modified example of the optical transmission device 800 relating to the first embodiment.

The optical transmission device 800 illustrated in FIG. 8 is a configuration example where only one APS processor 808 is provided as to all of the multiple wavelengths corresponding to the WDM, but is not restricted to this configuration, and multiple wavelengths may be divided into multiple groups, and an APS processor may be provided for each of the divided groups.

With an optical transmission device 1800 illustrated in FIG. 18, the multiple wavelengths (λ1 through λ2$m$) is divided into two groups of a first half wavelength group that is λ1 through λ$m$, and a second half group that is λ$m$+1 through λ2$m$, and two APS processors are provided corresponding to the two divided groups. Also, corresponding to the two APS processors provided, two sets of APS extracting/inserting circuits and optical signal detectors are also provided.

The operations of the various parts of the optical transmission device 1800 are similar to the portions corresponding to the optical transmission device 800. Also, the hardware configurations of the various parts of the optical transmission device 1800 are similar to the portions corresponding to the optical transmission device 800.

3. Second Embodiment

An optical transmission device and optical transmission network system relating to a second embodiment will be described below.

3-1. Configuration of APS Control Information

First, a configuration example of the APS control information processed by the optical transmission device relating to the second embodiment will be described.

FIG. 19 is a diagram illustrating an example of a format configuration of APS control information 1900 relating to the second embodiment. The APS control information 1900 illustrated in FIG. 19 applies to the WDM, similar to the APS control information 600 illustrated in FIG. 6, thereby including multiple pieces of divided APS control information that are provided corresponding to each of multiple different wavelengths (λ1 through λ$n$). However, with the APS control information 1900, unlike the APS control information 600, the pieces of divided APS control information have the same format as one another.

The pieces of divided APS control information include a Request field (bits 1 through 4 of byte 1) and a representative wavelength flag field (bit 8 of byte 4). Also, the pieces of divided APS control information further include a S/L field (bit 5 of byte 1), State field (bits 6 through 8 of byte 1), Requested Node ID field (bits 1 through 8 of byte 2), and Source Node ID field (bits 1 through 8 of byte 3). Details of the information stored in the fields are similar to the information stored in the APS control information 600.

Also, the transmission of the APS control information 1900 is performed by one optical signal having a representative wavelength (λ1 in FIG. 19) out of optical signals of multiple wavelengths, similar to the case of the APS control information 600. That is to say, the APS control information 1900 is transmitted to the optical transmission device positioned at the nodes within the OTN ring network, by one optical signal having a representative wavelength (λ1).

With the format configuration of the APS control information illustrated in FIG. 19, the Requested Node ID field and Source Node ID fields may be set by wavelength. Therefore, in the OTN ring network 100, as described above, even in the case that failures have occurred simultaneously in multiple locations in different OTN rings corresponding to different wavelengths, the switching node in the ring switching processing may be specified for each OTN ring where a failure has occurred in the APS control information 1900.

Accordingly, even in the case of failures occurring in multiple OTN rings, information of the switching node as to each OTN ring where a failure occurred may be notified to the optical transmission devices of the nodes, by receiving/transmitting APS control information 1900 by the optical signal having the representative wavelength, whereby ring switching processing may be appropriately executed for each OTN ring where the failure has occurred, and the failure in multiple OTN rings may be resolved.

3-2. Ring Switching Processing

Next, ring switching processing executed in the case that failures occur simultaneously in different OTN rings corresponding to different wavelengths in the OTN ring network 100 will be described.

An operation example of ring switching processing in the case that failures occur simultaneously in different OTN rings corresponding to different wavelengths, based on an example wherein a failure has occurred in the optical signal having a wavelength λ2 other than the representative wavelength λ1 between nodes B and C, and a failure has occurred in the optical signal having a wavelength λ4 other than the representative wavelength λ1 between nodes C and D, but even in the case that a similar failure occurs for another reason, the operations of the ring switching processing are the same. For example, the case of a failure occurring in an optical signal of two wavelengths other than the wavelengths λ1, λ2, and λ4 may be considered as another reason.

Figure 20:
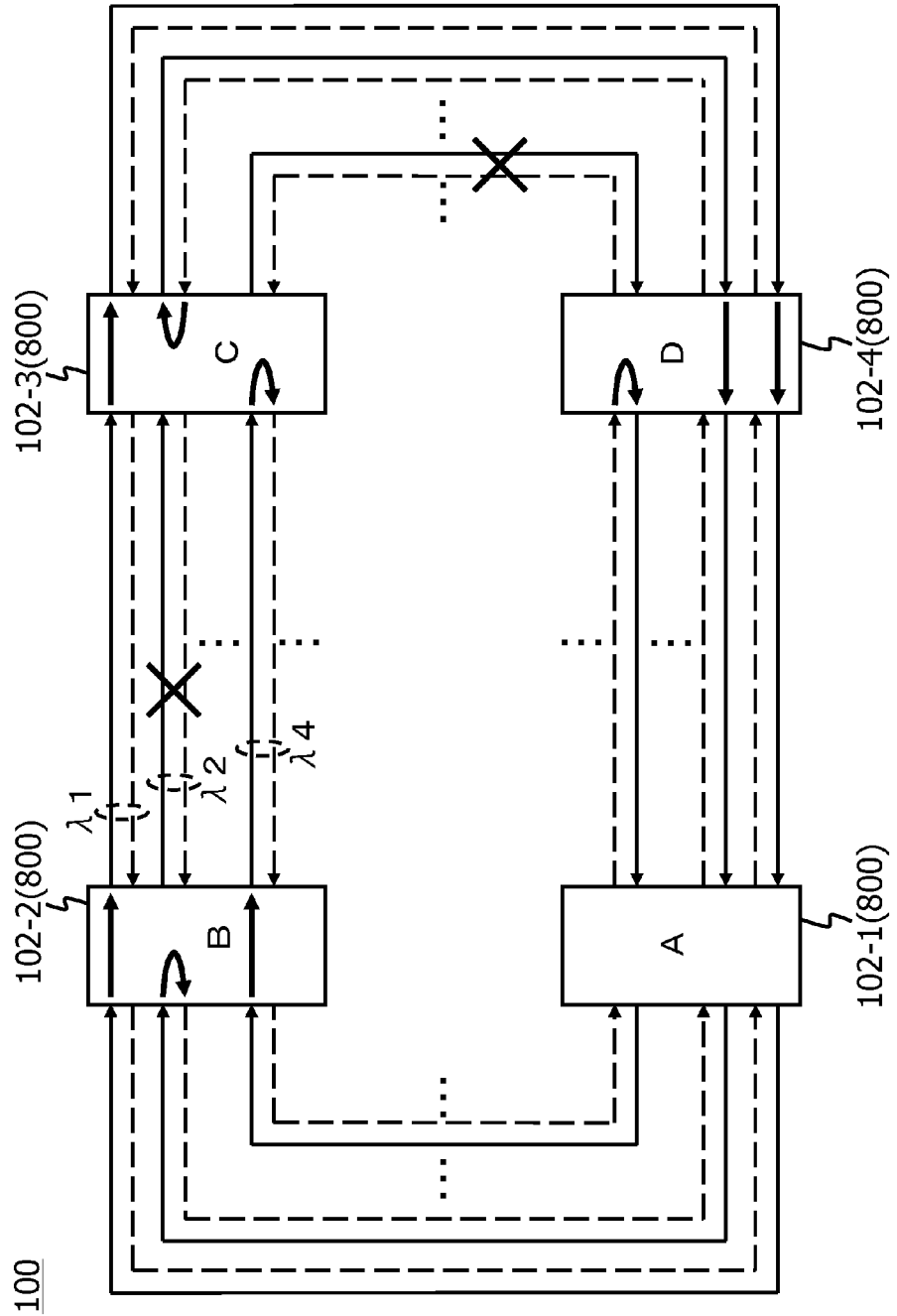
FIG. 20 is a diagram to describe the ring switching processing in the case that a failure occurs simultaneously for a different OTN ring corresponding to a different wavelength.

FIG. 20 is a diagram to describe the ring switching processing in the case that failures occur simultaneously in different OTN rings corresponding to different wavelengths.

The example illustrated in FIG. 20 illustrates an example wherein a failure has occurred in an optical signal having a certain wavelength λ2 other than the representative wavelength (λ1) from multiple wavelengths (λ1 through λ$n$) between nodes B and C in an OTN ring network, and subsequently a failure has occurred in an optical signal having a certain wavelength λ4 other than the representative wavelength (λ1) between nodes C and D. The optical transmission devices 800 illustrated in FIG. 8 are provided to the nodes of the OTN ring network 100. Also, the optical transmission devices 800 of the nodes use the wavelength λ1 as the representative wavelength from multiple wavelengths (λ1 through λn), and exchange the APS control information 600 illustrated in FIG. 19 with each other by the optical signal having the representative wavelength λ1. The reason for the failure example illustrated in FIG. 20 may be a case wherein a breakdown has occurred in the optical receiver/transmitter 812-2 corresponding to the wavelength λ2 on the node C side, in the optical transmission device 800 positioned at node B within the OTN ring network 100, and subsequently a breakdown has occurred in the optical receiver/transmitter 812-4 corresponding to the wavelength λ4 on the node D side, in the optical transmission device 800 positioned at node C.

3-2-1. Processing of Optical Transmission Devices at Stage of Failure Occurring in Optical Signal Having Certain Wavelength λ2 Between Nodes B and C First, at the stage of a failure occurring in the optical signal having a certain wavelength λ2 between nodes B and C, transmission processing of the APS control signal and ring switching processing described below are executed by the optical transmission device 800 positioned at node C.

The failure is occurring in an optical signal having the certain wavelength λ2 between nodes B and C, whereby in the optical transmission device 800 positioned at node C, the optical receiver/transmitter 802-2 on the node B side does not receive the optical signal of the wavelength λ2 normally from the optical transmission device positioned at node B.

Therefore, the optical signal detector 818-2 may only detect the average strength not within a given range for the optical signal of the wavelength λ2. Consequently, the optical signal detector 818-2 outputs a failure alarm signal to the APS processor 808, indicating that a failure has occurred in the optical signal of the wavelength λ2.

The APS processor 808 receives the failure alarm signal from the optical signal detector 818-2. The APS processor 808 determines that a failure has occurred between nodes B and C in the OTN ring corresponding to the certain wavelength λ2, based on the received failure alarm, and stores the setting information according to the situation of the occurred failure in each of the fields in the APS control information having the format configuration illustrated in FIG. 19.

Now, the setting information of the APS control information 1900 will be described.

FIG. 21 is a diagram describing a setting example of the APS control information in the case that a failure has occurred in the optical signal having the certain wavelength λ2 between nodes B and C.

The APS processor 808 stores "SF" (Signal Fail) in the Request field corresponding to the certain wavelength λ2, and stores "NR" (No Request) in the Request fields corresponding to wavelengths other than the wavelength λ2, for example. As described above, SF is information indicating a request for ring switching processing, and NR is information to request normal connection processing.

Further, the failure is occurring between nodes B and C, whereby the APS processor 808 stores distinguishing information indicating node C, which is its own node (node where the optical transmission device 800 including the APS processor 808 itself is positioned), in the Source Node ID field corresponding to the wavelength λ2 as a switching node in the ring switching processing, and stores the distinguishing information of node B, which is the other switching node, in the Requested Node ID field further corresponding to the wavelength λ2.

Also, in the example illustrated in FIG. 20, the wavelength λ1 is used as the representative wavelength, whereby the APS processor 808 stores "1" in the representative wavelength flag field corresponding to the wavelength λ1, and stores "0" in the representative wavelength flag field of a wavelength other than the wavelength λ1.

Now, returning to FIG. 20, description of the processing executed by the optical transmission device 800 positioned at node C will be continued.

The APS processor 808 outputs the APS control information 2100, after appropriate setting information is stored, to the APS extracting/inserting circuits 814 and 816. The optical receiver/transmitters 802-1 and 812-1 corresponding to the representative wavelength λ1 receive the corresponding OTN frame signals from the ODU processing circuits 804-1 and 810-1, convert the received electrical signal into an optical signal having the representative wavelength λ1, and output this. Thus, the optical transmission device 800 transmits the APS control information 2100 illustrated in FIG. 21 to the optical transmission devices positioned at adjacent nodes B and D, by the optical signal having the representative wavelength λ1.

Additionally, the APS processor 808 issues ring switching instructions to the ODU switch 806 to execute ring switching processing selectively for the certain wavelength λ2.

The ODU switch 806 executes ring switching processing selectively for the wavelength λ2 of the certain OTN ring, based on the ring switching instructions from the APS processor 808. That is to say, the ODU switch 806 executes return processing of the transfer path selectively for the OTN frame signals output by the ODU processing circuit 810-2 on the node D side. Thus, the optical transmission device 800 positioned at node C selectively executes return processing of the transfer path in order to switch the next transmission destination of the optical signal from note B to node D, selectively for the OTN ring corresponding to the certain wavelength λ2.

On the other hand, with the optical transmission device 800 positioned at node B, the ring switching processing described below is executed.

With the optical transmission device 800 positioned at node B, for example, the optical receiver/transmitter 812-1 receives the APS control information 2100 by receiving an optical signal having the representative wavelength λ1 from node C via a short path (without transmitting via another node). Further, the optical receiver/transmitter 802-1 receives the APS control information 2100 illustrated in FIG. 21 by receiving an optical signal having the representative wavelength λ1 from node C via a long path (via nodes D and A). The APS processor 808 recognizes that a failure has occurred in the certain wavelength λ2 in the OTN ring network 100, based on the received APS control information 2100, and recognizes that the failure thereof is occurring in the certain wavelength λ2, that the failure thereof is occurring between its own node (node B) and the adjacent node C, and that its own node is specified as the switching node in the ring switching processing. Consequently, the APS processor 808 executes ring switching instructions to the ODU switch 806 to execute ring switching processing for the certain wavelength λ2.

The ODU switch 806 executes ring switching processing for the certain wavelength λ2, based on ring switching instructions from the APS processor 808. That is to say, the ODU switch 806 executes return processing of the transmission path selectively for the OTN frame signals output from the ODU processing circuit 804-2 on the node A side. Thus, the optical transmission device 800 positioned at node B executes return processing of the transmission path in order to switch the next transmission destination of the optical signal from node C to node A, selectively for the OTN rings corresponding to the certain wavelength $\lambda 2$.

3-2-2. Processing of Optical Transmission Devices at Stage of Failure Occurring in Optical Signal Having Certain Wavelength $\lambda 4$ between Nodes C and D Further, at the stage of a failure occurring in the optical signal having a certain wavelength $\lambda 4$ between nodes C and D, transmission processing of the APS control signal and ring switching processing described below are executed by the optical transmission device 800 positioned at node D.

The failure is occurring in an optical signal having the certain wavelength $\lambda 4$ between nodes C and D, whereby in the optical transmission device 800 positioned at node D, the optical receiver/transmitter 802-2 on the node C side does not receive the optical signal of the wavelength $\lambda 4$ normally from the optical transmission device positioned at node C.

Therefore, the optical signal detector 818-2 may only detect the average strength not within a given range for the optical signal of the wavelength $\lambda 4$. Consequently, the optical signal detector 818-2 outputs a failure alarm signal to the APS processor 808, indicating that a failure has occurred in the optical signal of the wavelength $\lambda 4$.

The APS processor 808 receives the failure alarm signal from the optical signal detector 818-2. The APS processor 808 determines that a failure has occurred between nodes C and D in the OTN ring corresponding to the certain wavelength $\lambda 4$, based on the received failure alarm, and updates the setting information according to the situation of the occurred failure in each of the fields in the APS control information 2100 having the format configuration illustrated in FIG. 21.

Now, the setting information of the APS control information 2100 will be described.

FIG. 22 is a diagram describing a setting example of the APS control information 2200 in the case that a failure has occurred in the optical signal having the certain wavelength $\lambda 4$ between nodes C and D.

The APS processor 808 stores "SF" (Signal Fail) in the Request field corresponding to the certain wavelength $\lambda 4$, and stores "NR" (No Request) in the Request fields corresponding to wavelength $\lambda 4$ and to wavelengths other than the wavelength $\lambda 2$ where "SF" is already stored, for example.

Further, the failure is occurring between nodes C and D, whereby the APS processor 808 stores distinguishing information indicating node C, which is its own node (node where the optical transmission device 800 including the APS processor 808 itself is positioned), in the Source Node ID field corresponding to the wavelength $\lambda 4$ as a switching node in the ring switching processing, and stores the distinguishing information of node B, which is the other switching node, in the Requested Node ID field further corresponding to the wavelength $\lambda 4$.

Also, in the example illustrated in FIG. 20, the wavelength $\lambda 1$ is used as the representative wavelength, whereby the APS processor 808 maintains a "1" in the representative wavelength flag field corresponding to the wavelength $\lambda 1$, and maintains "0" in the representative wavelength flag field of a wavelength other than the wavelength $\lambda 1$.

Now, returning to FIG. 20, description of the processing executed by the optical transmission device 800 positioned at node D will be continued.

The APS processor 808 outputs the APS control information 2200, after appropriate setting information is stored, to the APS extracting/inserting circuits 814 and 816. The optical receiver/transmitters 802-1 and 812-1 corresponding to the representative wavelength $\lambda 1$ receive the corresponding OTN frame signals from the ODU processing circuits 804-1 and 810-1, convert the received electrical signal into an optical signal having the representative wavelength $\lambda 1$, and output this. Thus, the optical transmission device 800 transmits the APS control information 2200 illustrated in FIG. 22 to the optical transmission devices positioned at adjacent nodes C and A, by the optical signal having the representative wavelength $\lambda 1$.

Additionally, the APS processor 808 issues ring switching instructions to the ODU switch 806 to execute ring switching processing selectively for the certain wavelength $\lambda 4$.

The ODU switch 806 executes ring switching processing selectively for the wavelength $\lambda 4$ of the certain OTN ring, based on the ring switching instructions from the APS processor 808. That is to say, the ODU switch 806 executes return processing of the transfer path selectively for the OTN frame signals output by the ODU processing circuit 810-2 on the node A side. Thus, the optical transmission device 800 positioned at node D selectively executes return processing of the transfer path in order to switch the next transmission destination of the optical signal from note C to node A, selectively for the OTN ring corresponding to the certain wavelength $\lambda 4$.

On the other hand, with the optical transmission device 800 positioned at node C, the ring switching processing described below is executed.

With the optical transmission device 800 positioned at node C, for example, the optical receiver/transmitter 812-1 receives the APS control information 2200 by receiving an optical signal having the representative wavelength $\lambda 1$ from node D via a short path (without transmitting via another node). Further, the optical receiver/transmitter 802-1 receives the APS control information 2200 illustrated in FIG. 22 by receiving an optical signal having the representative wavelength $\lambda 1$ from node D via a long path (via nodes A and B). The APS processor 808 recognizes that a failure has occurred in the certain wavelength $\lambda 4$ in the OTN ring network 100, based on the received APS control information 2200, and recognizes that the failure thereof is occurring in the certain wavelength $\lambda 4$, that the failure thereof is occurring between its own node (node C) and the adjacent node D, and that its own node is specified as the switching node in the ring switching processing. Consequently, the APS processor 808 executes ring switching instructions to the ODU switch 806 to execute ring switching processing for the certain wavelength $\lambda 4$.

The ODU switch 806 executes ring switching processing for the certain wavelength $\lambda 4$, based on ring switching instructions from the APS processor 808. That is to say, the ODU switch 806 executes return processing of the transmission path selectively for the OTN frame signals output from the ODU processing circuit 804-2 on the node B side. Thus, the optical transmission device 800 positioned at node C executes return processing of the transmission path in order to switch the next transmission destination of the optical signal from node D to node B, selectively for the OTN rings corresponding to the certain wavelength $\lambda 4$.

As described above, in the case that failures occur simultaneously in different OTN rings corresponding to different wavelengths, in the optical transmission devices positioned at the nodes position on both ends of the transmission path including the location of the failure occurrence, APS control information including the information indicating the wavelength of the ring where the failure has occurred is transmitted, and further, ring switching processing selectively for the certain OTN rings where the failure has occurred is executed, whereby the failures that simultaneously occurred in different OTN rings may be appropriately resolved.

3-2-3. Sequence of Ring Switching Processing

Next, an example of a sequence of ring switching processing will be described.

FIG. 23 is a diagram illustrating an example of a sequence of ring switching processing in the case that a failure occurs in an optical signal having a certain wavelength $\lambda 2$ between nodes B and C, and that a failure occurring in an optical signal having a certain wavelength $\lambda 4$ between nodes B and C.

As illustrated in FIG. 23, with the OTN ring network 100, during a time period in which no failure is occurring between any of the nodes (before point-in-time t1), the optical transmission devices 800 transmit APS control information, wherein "NR" (No Request) is stored in the Request field corresponding to all of the wavelengths ($\lambda 1$ through $\lambda n$), with each other between adjacent nodes. As described above, NR is information indicating a request for normal connection processing. Thus, the optical transmission devices for each node do not execute ring switching processing, but executes normal connection processing.

Conversely, at point-in-time t1, in the case that a failure has occurred in the optical signal of a certain wavelength $\lambda 2$, at point-in-time t2 the optical transmission circuit 800 positioned at node C determines that a failure has occurred between nodes B and C in the OTN ring corresponding to the certain wavelength $\lambda 2$ (SF ($\lambda 2$) detect), and determines that its own node (node C) and node B are the switching nodes in the ring switching processing, as illustrated in FIG. 20. Subsequently, as illustrated in FIG. 21, the optical transmission device 800 of node C stores appropriate setting information in the fields of the APS control information 1900.

Next, at point-in-time t3, the optical transmission device 800 at node C transmits the APS control information 2100 illustrated in FIG. 21 to the optical transmission devices positioned at adjacent nodes B and D, by the optical signals having the representative wavelength $\lambda 1$. Subsequently, the optical transmission device 800 executes return processing of the transmission path in order to switch the next transmission destination node of the optical signal to node D instead of node B, selectively for the OTN ring corresponding to the certain wavelength $\lambda 2$, thereby executing ring switching processing selectively for the OTN ring corresponding to the certain wavelength $\lambda 2$.

Next, at point-in-time t4, the optical transmission device 800 at node B receives the APS control information 2100 illustrated in FIG. 21 from node C, by the optical signals having the representative wavelength $\lambda 1$. As described in FIG. 20, the optical transmission device 800 at node B recognizes that a failure has occurred between nodes B and C in the OTN ring corresponding to the certain wavelength $\lambda 2$, based on the received APS control information 2100, and recognizes that its own node is specified as the switching node in the ring switching processing.

Also, similar to the optical transmission device 800 at node D, the APS control information 2100 illustrated in FIG. 21 is received from node C by the optical signal having the representative wavelength $\lambda 1$. Subsequently, the optical transmission device 800 at node D recognizes that a failure has occurred between nodes B and C in the OTN ring corresponding to the certain wavelength $\lambda 2$, based on the received APS control information 2100.

Next, at point-in-time t5, the optical transmission device 800 at node B transmits the APS control information 2100 illustrated in FIG. 21 to the optical transmission device positioned at adjacent node A, by the optical signals having the representative wavelength $\lambda 1$. Subsequently, the optical transmission device 800 executes return processing of the transmission path in order to switch the next transmission destination node of the optical signal to node A instead of node C, selectively for the OTN ring corresponding to the certain wavelength $\lambda 2$, based on the recognition that its own node is the switching node, thereby executing ring switching processing selectively for the OTN ring corresponding to the certain wavelength $\lambda 2$.

Also, the optical transmission device 800 at node D similarly transmits the APS control information 2100 illustrated in FIG. 21 to the optical transmission device positioned at adjacent node A, by the optical signal having the representative wavelength $\lambda 1$.

Subsequently, the optical transmission device 800 at node A receives the APS control information 2100 illustrated in FIG. 21 from each of nodes B and D, from the optical signals having the representative wavelength $\lambda 1$. The optical transmission device 800 at node A recognizes that a failure has occurred between nodes B and C in the OTN ring corresponding to the certain wavelength $\lambda 2$, based on the received APS control information 2100.

Next, in the case that a failure has occurred at point-in-time t6 in an optical signal of the certain wavelength $\lambda 4$, at point-in-time t7 the optical transmission device 800 positioned at node D determines that a failure has occurred between nodes C and D in the OTN ring corresponding to the certain wavelength $\lambda 4$ (SF ($\lambda 2$, $\lambda 4$) detect), and determines that its own node (node D) and node C are the switching nodes in the ring switching processing, as illustrated in FIG. 20. Subsequently, as illustrated in FIG. 22, the optical transmission device 800 of node D stores appropriate setting information in the fields of the APS control information 2200.

Next, at point-in-time t8, the optical transmission device 800 transmits the APS control information 2200 illustrated in FIG. 22 to the optical transmission device positioned at the adjacent nodes A and C, by the optical signal having the representative wavelength $\lambda 1$. Subsequently, the optical transmission device 800 at node D executes return processing of the transmission path in order to switch the next transmission destination node of the optical signal to node A instead of node C, selectively for the OTN ring corresponding to the certain wavelength $\lambda 4$, thereby executing ring switching processing selectively for the OTN ring corresponding to the certain wavelength $\lambda 4$.

Next, at point-in-time t9, the optical transmission device 800 at node C receives the APS control information 2200 illustrated in FIG. 22 from node D. As described in FIG. 20, the optical transmission device 800 at node C recognizes that a failure has occurred between nodes C and D in the OTN ring corresponding to the certain wavelength $\lambda 4$, based on the received APS control information 2200, and recognizes that its own node is specified as the switching node in the ring switching processing.

Also, similar to the optical transmission device 800 at node A, the APS control information 2200 illustrated in FIG. 22 is received from node D by the optical signal having the representative wavelength $\lambda 1$. Subsequently, the optical transmission device 800 at node A recognizes that a failure has occurred between nodes C and D in the OTN ring corresponding to the certain wavelength $\lambda 4$, based on the received APS control information 2200.

Next, at point-in-time t10, the optical transmission device 800 transmits the APS control information 2200 illustrated in FIG. 22 to the optical transmission device positioned at the adjacent node B, by the optical signal having the representative wavelength $\lambda 1$. Subsequently, the optical transmission device 800 at node C executes return processing of the transmission path in order to switch the next transmission destination node of the optical signal to node B instead of node D, selectively for the OTN ring corresponding to the certain wavelength λ4, thereby executing ring switching processing selectively for the OTN ring corresponding to the certain wavelength λ4.

Also, similar to the optical transmission device 800 and node A, the APS control information 2200 illustrated in FIG. 22 is transmitted to the optical transmission device positioned at the adjacent node B, by the optical signal having the representative wavelength λ1.

Subsequently, the optical transmission device 800 at node B receives the APS control information 2200 illustrated in FIG. 22 from each of nodes C and A, from the optical signals having the representative wavelength λ1. The optical transmission device 800 at node A recognizes that a failure has occurred between nodes C and D in the OTN ring corresponding to the certain wavelength λ4, based on the received APS control information 2200.

As described above, in the case that failures occur simultaneously in different OTN rings corresponding to different wavelengths, in the OTN ring network, through exchange of APS control signals the optical transmission devices of the nodes recognize in which wavelength ring the failure has occurred, and which node is the switching node in the ring switching process, and executes the ring switching processing selectively for the certain OTN ring having the failure occur, whereby the failure may be resolved simultaneously for different OTN rings.

The optical transmission device and optical transmission network system according to embodiments exemplifying the present disclosure have been described above, but the present disclosure is not to be limited to the embodiments disclosed specifically, and various modifications and changes may be made within the scope and intent of the claims. The technology disclosed in the various examples may be combined as appropriate, provided these are not mutually contradictory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device, one of a plurality of optical transmission devices that are interconnected so as to form a ring network, the optical transmission device comprising:
    a receiver configured to receive a plurality of optical signals from a first optical transmission device that is an adjacent optical transmission device of the optical transmission device in the ring network, each optical signal having a different wavelength;
    a transmitter configured to transmit the received plurality of optical signals to a second optical transmission device that is another adjacent optical transmission device of the optical transmission device in the ring network;
    a detector configured to detect a plurality of signal strengths, each signal strength being a strength of each optical signal; and
    a processor configured to:
        identify at least one optical signal of which signal strength is out of a given range, among the plurality of optical signals other than a specified optical signal having a specified wavelength, based on the plurality of signal strengths, and
        transmit control information requesting to control the identified at least one optical signal to be returned back in the first optical transmission device, the control information being transmitted using the specified optical signal having the specified wavelength via the ring network,
        wherein, when signal strength of the specified optical signal is out of the given range, the processor is configured to select another specified optical signal for transmitting the control information instead of the specified optical signal, from among the plurality of optical signals other than the specified optical signal, the another specified optical signal having another specified wavelength differing from the specified wavelength of the specified optical signal.

2. The optical transmission device according to claim 1, wherein, when the detector detects that at least two of the plurality of signal strengths are out of a given range, the processor is configured to transmit the control information requesting to control all of the plurality of optical signals to be returned back in the first optical transmission device.

3. The optical transmission device according to claim 1, the control information further including:
    originating node distinguishing information indicating a node to serve as the origination of the control information indicating the identified at least one optical signal; and
    address node distinguishing information indicating a node to serve as the destination of the control information indicating the identified at least one optical signal;
    wherein, in the information indicating the identified at least one optical signal, the origination node distinguishing information and the destination node distinguishing information are correlated to just one wavelength selected from one of the plurality of optical signals received from the first optical transmission device.

4. The optical transmission device according to claim 1, the control information further including:
    originating node distinguishing information indicating a node to serve as the origination of the control information indicating the identified at least one optical signal; and
    address node distinguishing information indicating a node to serve as the destination of the control information indicating the identified at least one optical signal;
    wherein, in the control information, the origination node distinguishing information and the destination node distinguishing information are correlated to each wavelength of the plurality of optical signals received from the first optical transmission device.

5. The optical transmission device according to claim 1, the control information further including:
    a plurality of pieces of divided information indicating the identified at least one optical signal that are correlated to each wavelength of the plurality of optical signals received from the first optical transmission device,
    wherein the processor transmits the control information indicating the identified at least one optical signal by the pieces of divided information in a time-division manner, by the optical signal having a representative wavelength.

6. The optical transmission device according to claim 1, wherein the processor is configured to return the identified at least one optical signals that are received from the second optical transmission device, to the second optical transmission device.

7. The optical transmission device according to claim 1, wherein the control information is control information of automatic protection switching (APS).

8. An optical transmission device of a plurality of optical transmission devices that are interconnected so as to form a ring network, the optical transmission device comprising:
- a receiver configured to receive a plurality of optical signals from a first optical transmission device that is an adjacent optical transmission device of the optical transmission device in the ring network, each optical signal having a different wavelength;
- a transmitter configured to transmit the received plurality of optical signals to a second optical transmission device that is another adjacent optical transmission device of the optical transmission device in the ring network; and
- a processor configured to receive control information requesting to control an identified at least one optical signal to be returned back in the optical transmission device, the identified at least one optical signal of which signal strength is out of a given range in the ring network, the identified at least one optical signal being identified among the plurality of optical signals other than a specified optical signal having a specified wavelength, the control information being transmitted using the specified optical signal having the specified wavelength via the ring network, the control information being received from the first optical transmission device,
- wherein, when signal strength of the specified optical signal is out of the given range, the processor is configured to receive the control information from another specified optical signal instead of the specified optical signal, from among the plurality of optical signals other than the specified optical signal, the another specified optical signal having another specified wavelength differing from the specified wavelength of the specified optical signal.

9. An optical network system including a plurality of optical transmission devices that are interconnected so as to form a ring network, the system comprising:
- a first optical transmission device in the ring network; and
- a second optical transmission device being an adjacent optical transmission device of the first optical transmission device in the ring network, and;
- the first optical transmission device further including:
  - a first receiver configured to receive a plurality of optical signals from the second optical transmission device, each optical signal having a different wavelength;
  - a first transmitter configured to transmit the received plurality of optical signals to a third optical transmission device that is another adjacent optical transmission device of the first optical transmission device in the ring network;
  - a detector configured to detect a plurality of signal strengths, each signal strength being a strength of each optical signal; and
  - a first processor configured to:
    - identify at least one optical signal of which signal strength is out of a given range, among the plurality of optical signals other than a specified optical signal having a specified wavelength, based on the plurality of signal strengths, and
    - transmit control information requesting to control the identified at least one optical signal to be returned back in the second optical transmission device, the control information being transmitted using the specified optical signal having the specified wavelength via the ring network,
    - wherein, when signal strength of the specified optical signal is out of the given range, the first processor is configured to select another specified optical signal for transmitting the control information instead of the specified optical signal, from among the plurality of optical signals other than the specified optical signal, the another specified optical signal having another specified wavelength differing from the specified wavelength of the specified optical signal,
- and the second optical transmission device further including:
  - a second receiver configured to receive a plurality of optical signals from a fourth optical transmission device that is another adjacent optical transmission device of the second optical transmission device in the ring network, each optical signal having a different wavelength;
  - a second transmitter configured to transmit the received plurality of optical signals to the first optical transmission device; and
  - a second processor configured to:
    - receive the control information requesting to control the identified at least one optical signal to be returned back in the second optical transmission device, the control information being received using the specified optical signal having the specified wavelength via the ring network.

* * * * *